US007426687B1

(12) United States Patent  (10) Patent No.: US 7,426,687 B1
Schultz et al.  (45) Date of Patent: Sep. 16, 2008

(54) AUTOMATIC LINKING OF DOCUMENTS

(75) Inventors: Dietrich W. Schultz, Foster City, CA (US); Hal R. Schectman, Portola Valley, CA (US); Judith A. Hay, Mountain View, CA (US); Michael P. Thompson, San Carlos, CA (US); Kevin G. Wallace, San Francisco, CA (US); Steven R. Kusmer, San Francisco, CA (US)

(73) Assignee: Omniture, Inc., Orem, UT (US)

( * ) Notice: Subject to any disclaimer, the term of this patent is extended or adjusted under 35 U.S.C. 154(b) by 602 days.

(21) Appl. No.: 10/039,536

(22) Filed: Jan. 4, 2002

Related U.S. Application Data

(60) Provisional application No. 60/260,084, filed on Jan. 4, 2001, provisional application No. 60/260,000, filed on Jan. 4, 2001.

(51) Int. Cl.
*G06F 17/00* (2006.01)
(52) U.S. Cl. .................. 715/208; 715/205; 715/206; 715/207
(58) Field of Classification Search .............. 715/500, 715/501.1, 512, 513, 530, 200, 205, 206, 715/207, 208, 273
See application file for complete search history.

(56) References Cited

U.S. PATENT DOCUMENTS

| | | | | |
|---|---|---|---|---|
| 5,956,736 A | * | 9/1999 | Hanson et al. | ............ 715/513 |
| 5,958,008 A | | 9/1999 | Pogrebisky et al. | |
| 5,974,412 A | * | 10/1999 | Hazlehurst et al. | ............ 707/3 |
| 5,983,227 A | * | 11/1999 | Nazem et al. | ............ 707/10 |
| 5,983,245 A | | 11/1999 | Newman et al. | |
| 6,052,730 A | | 4/2000 | Felciano et al. | |
| 6,088,710 A | | 7/2000 | Dreyer et al. | |
| 6,134,552 A | | 10/2000 | Fritz et al. | |
| 6,141,666 A | | 10/2000 | Tobin | |
| 6,185,587 B1 | | 2/2001 | Bernardo et al. | |
| 6,219,680 B1 | | 4/2001 | Bernardo et al. | |
| 6,247,032 B1 | | 6/2001 | Bernardo et al. | |
| 6,272,505 B1 | | 8/2001 | De La Huerga | |
| 6,289,353 B1 | * | 9/2001 | Hazlehurst et al. | ......... 707/102 |
| 6,304,886 B1 | | 10/2001 | Bernardo et al. | |
| 6,308,188 B1 | | 10/2001 | Bernardo et al. | |
| 6,359,633 B1 | * | 3/2002 | Balasubramaniam et al. | ......... 715/760 |
| 6,397,210 B1 | | 5/2002 | Stern et al. | |
| 6,549,944 B1 | | 4/2003 | Weinberg et al. | |
| 6,557,015 B1 | * | 4/2003 | Bates et al. | ............ 715/501.1 |
| 6,574,644 B2 | * | 6/2003 | Hsu et al. | ............ 715/501.1 |
| 6,581,061 B2 | * | 6/2003 | Graham | ............ 707/10 |
| 6,650,343 B1 | * | 11/2003 | Fujita et al. | ............ 715/760 |

(Continued)

OTHER PUBLICATIONS

Microsoft Corporation, "Saving Web Pages, Offline Viewing," Microsoft Internet Explorer Help page [retrieved on Oct. 30, 2002], 1 page.

(Continued)

*Primary Examiner*—Stephen Hong
*Assistant Examiner*—Gregory J Vaughn
(74) *Attorney, Agent, or Firm*—Pattric J. Rawlins; Procopio Cory Hargreaves & Savitch LLP

(57) ABSTRACT

A document publishing system. Documents can be automatically linked. Links are automatically created within a document to other documents, or to locations within the same document.

16 Claims, 20 Drawing Sheets

U.S. PATENT DOCUMENTS

| | | | |
|---|---|---|---|
| 6,654,734 B1 * | 11/2003 | Mani et al. | 707/2 |
| 6,658,402 B1 | 12/2003 | Dutta | |
| 6,658,623 B1 * | 12/2003 | Schilit et al. | 715/513 |
| 6,670,968 B1 * | 12/2003 | Schilit et al. | 715/760 |
| 6,674,453 B1 * | 1/2004 | Schilit et al. | 715/810 |
| 6,684,369 B1 | 1/2004 | Bernardo et al. | |
| 6,725,428 B1 | 4/2004 | Pareschi et al. | |
| 6,742,163 B1 | 5/2004 | Ono et al. | |
| 6,772,393 B1 | 8/2004 | Estrada et al. | |
| 6,810,404 B1 * | 10/2004 | Ferguson et al. | 707/200 |
| 6,820,094 B1 * | 11/2004 | Ferguson et al. | 707/200 |
| 6,820,235 B1 | 11/2004 | Bleicher et al. | |
| 6,820,236 B1 * | 11/2004 | Bates et al. | 715/501.1 |
| 6,823,495 B1 * | 11/2004 | Vedula et al. | 715/805 |
| 6,877,135 B1 * | 4/2005 | Kamiwada et al. | 715/501.1 |
| 6,938,205 B1 * | 8/2005 | Hanson et al. | 715/526 |
| 7,039,860 B1 * | 5/2006 | Gautestad | 715/513 |
| 7,076,728 B2 * | 7/2006 | Davis et al. | 715/513 |
| 2001/0025287 A1 * | 9/2001 | Okabe et al. | 707/511 |

OTHER PUBLICATIONS

Adobe Systems Incorporated, "Converting Web Pages to PDF," Adobe Acrobat 4.0 Guide [online], [retrieved on Oct. 30, 2002], pp. 202-207.

Macromedia, Inc., Dreamweaver User Manual, pp. 51-60, Dec. 1999.

Macromedia, Inc., Dreamweaver User Manual, pp. 109-175, Dec. 1999.

Macromedia, Inc., Dreamweaver User Manual, pp. 355-376, Dec. 1999.

* cited by examiner

AUTOMATIC LINKING OF DOCUMENTS

This application claims priority under 35 U.S.C. §119(e) from U.S. Patent Application Ser. No. 60/260,084, filed Jan. 4, 2001, entitled, "System and Method for Managing and Publishing Web Content," which is incorporated by reference in its entirety. This application also claims priority under 35 U.S.C. §119(e) from U.S. Patent Application Ser. No. 60/260,000, filed Jan. 4, 2001, entitled, "URL Rewriting System And Method," which is incorporated by reference in its entirety.

BACKGROUND

1. Field of the Invention

This invention relates to information systems and, more particularly, to a system and method for automating the creation of electronic documents.

2. Background of the Invention

Many individuals and organizations create and maintain documents that contain information. The individual documents can be organized in such a way as to form a coherent set of documents that provide information about the individual or company, or other useful information. One example of such a document is a web page, and one example of the coherent set of documents is a web site. The web sites include large numbers of web pages, which are linked together, so that people can easily access and move back and forth between the web pages. These web sites are created and periodically changed, modified, or updated. It is desirable to provide an Internet-based web publishing system and method that simplifies the creation and editing of web sites.

It can take a high level of technical skill to create and organize a web site and the pages on that web site. In contrast, adding content can be a simple operation. However, if users of little skill access the web site to add content, they may make a mistake that adversely affects the operation of the web site. Thus, it is desirable to allow technically skilled users to create and organize a web site and give them the ability to allow less skilled users to enter content without the possibility of the less skilled users creating problems with the web site.

Typically, when a new web page is created, links to that web page must be manually added to the pages from which the new web page will be linked. Every time a web page is added, and often when a web page is changed, the page that links to that page must be changed. This can be a time consuming and challenging task. It is easy to lose track of which documents should link to the created or modified document, so it is easy to fail to update the links correctly. Similarly, some web pages have links to other locations on the same page. When the web page is changed the links must also be changed. Again, this task can be time consuming and difficult to do correctly. Users of limited skill would typically be unable to perform this task. Thus, it is also desirable to provide a way to more easily add and update links to documents such as web pages.

Further, in such a web publishing system, the locations of some web pages can change in relation to one another as pages are created, edited, previewed, published, and maintained. For example, a web page may be in one location during editing, then moved to another location for normal use and viewing of that web page. System maintenance may require that web pages be moved from server to server. Certain uniform resource locators ("URL"s) within the web pages do not function correctly if the location of the web pages containing the URL changes. Therefore, it is also desirable to provide a way to automatically modify URLs so that the URLs of web pages work correctly in a web publishing or similar system.

SUMMARY OF THE INVENTION

One embodiment of the present invention automatically generates, in a first document, a link or links to another document or documents. The first document includes a specification for what documents the first document should link to, and how the links should be presented. When the first document is created or edited, the available documents are searched for documents that meet the specification. Links to documents that meet the specification are generated and added to the first document. Alternatively, specified information, such as the titles, from the other documents is added to the first document instead of, or in addition to, the links.

Another embodiment of the present invention automatically generates within a document an index to the information within that document. A user adds pieces of data to the document. For each piece of data, an index entry is generated. The index entry may include a link to the location in the document of the data piece.

DETAILED DESCRIPTION OF THE PREFERRED EMBODIMENTS

Introduction

Figure 1A:
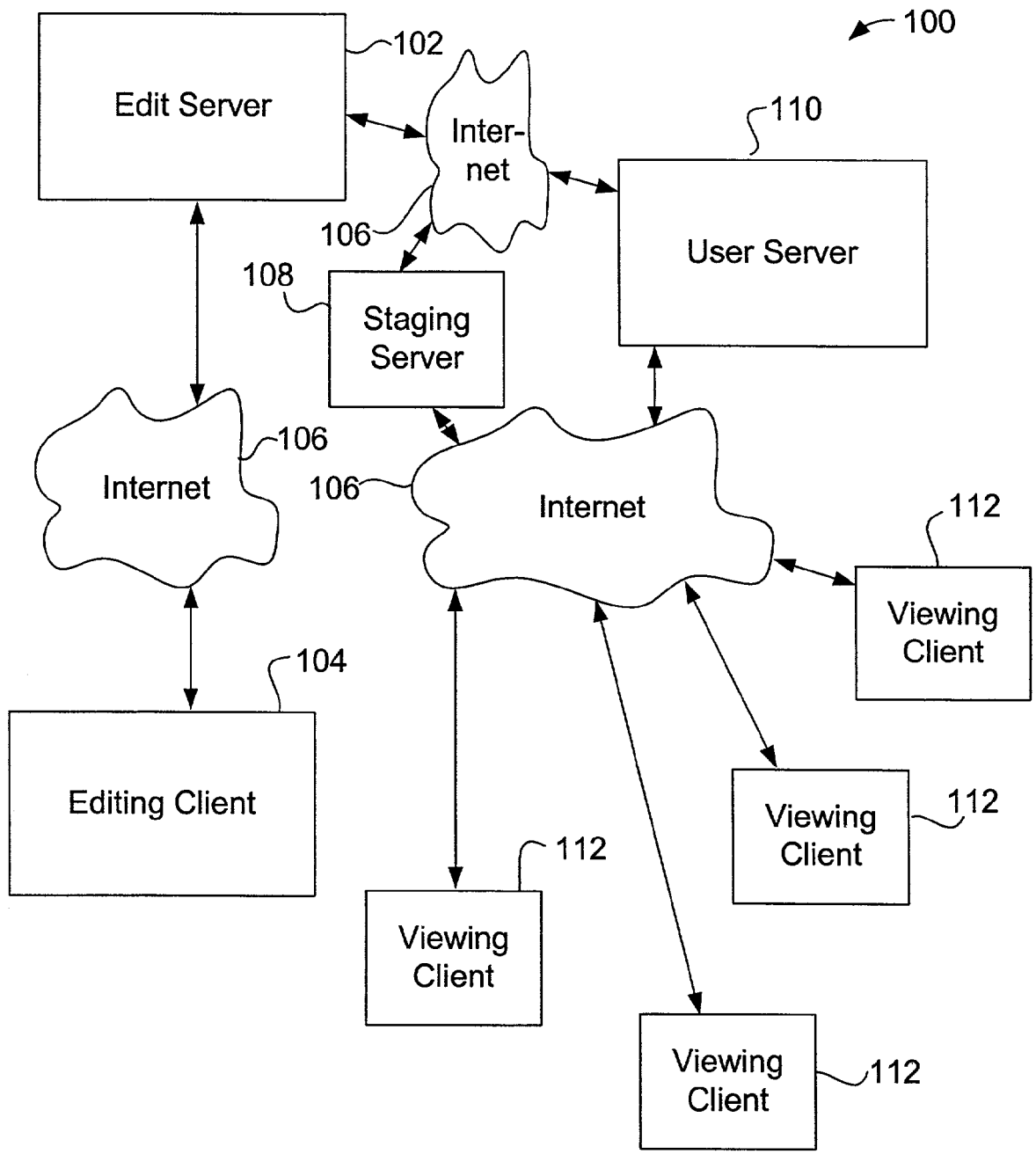
FIG. 1(a) is a block diagram of a web publishing system that automatically rewrites URLs.

Documents, such as web pages on the Internet, are created and modified more easily by use of a document creation and editing system. The web pages are created by combining a template file and a content file. A user creates a template file that provides common elements to web pages based on that template. Thus, the template will typically provide a general "look and feel" for web pages based on that template. The template also includes definitions for what type of information will be added to create the web pages based on that template. The same or different user then creates web pages based on that template by entering content to be used with the template. The web page is then created by combining the template with the content.

In some embodiments, there are multiple levels of users. Higher level users may access all features of the document creation and editing system. These higher level users may create templates, organize the web site, and define what features lower level users have access to. Lower level users have access to fewer than all the features of the system. For example, a lower level user may have the ability to form web pages by entering content related to a single template or a discrete set of templates. With the template, the higher level users have defined what sort of content the lower level user may enter and how that content will appear in the web page. The higher level users may prevent the lower level users from making mistakes that adversely affect the operation of the web site and web pages by limiting the access of the lower level users to certain narrowly defined functions.

The system also makes it easy to link documents, such as web pages, together. The system allows users to define what sort of links will be created. These links can be links within one document to other, separate, documents. The links can also be links to locations within the same document. The system then automatically creates and updates the links as documents are created and modified.

Further, documents, such as web pages on the Internet, contain indirect addresses, such as URLs, that refer to other documents and files. It is often useful to modify these addresses. For example, some of these addresses indicate a location relative to other locations. With some such addresses, if the web page moves, the address may not function correctly. Some embodiments of the present invention modify indirect addresses in documents, such as URLs in web pages, as the location of the document changes or under other circumstances so that the indirect addresses continue to function correctly. In the described embodiment, the indirect addresses are URLs, and the documents are web pages on the Internet. However, the invention is not limited to such an application, and also applies to other types of documents with other indirect addresses and on other networks.

DEFINITIONS

Definitions of various selected terms are listed below.

Template: A document that defines the design elements of a web page. Typically, the template will define a general "look and feel" for web pages based on that template. The template may also define other elements, such as keywords, or a brief description of the page. The template includes defined sections for adding content. Generally, the document is written in hypertext markup language ("HTML"), or an extended HTML.

Content: Data that provides information for a particular instance of a template. Content is combined with a template to form a web page. Typically, multiple content files exist related to the same template, such that each content file is combined with the template to form a separate web page based on that template.

Web Page: For clarity, the description describes the invention in the context of web pages. However, the invention is not limited to web pages, but also includes other document forms. Thus, the term "web page" as used herein does not only refer to web pages, such as those known to be used on the World Wide Web on the Internet, but refers to other document types as well.

Publish: Combining the template with content files to create the web pages, and placing the web pages on the user server for normal use.

Stage: Combining the template with content files to create the web pages, and placing the web pages on the staging server to allow review of the web pages before sending them to the user server.

Template preview: In a template preview, the user sees the template as it would look as part of a web page.

Page preview: In a page preview, the user sees a web page as it would look on the staging server or user server. A template and content are combined in a page preview.

Site base: The root of the client's web site, which will contain the web pages if the web pages are published externally. Example: http://www.client.com.

Internal web page: A web page managed by the web publishing system. The internal web pages are created or edited by the web publishing system.

External web page: A web page not managed by the web publishing system. While the web publishing system does not create or edit external web pages, external web pages may be referenced by URLs of internal web pages.

URL: Stands for "Uniform Resource Locator." The URL defines the location of a file. The URL is a type of indirect address, and refers to the direct address. While the term URL is commonly used in the description below, other types of indirect addresses may also be used.

Absolute URL: A URL that includes the complete scheme and server. Example: http://www.atomz.com/images/logo.gif. An absolute URL is not relative to the location of the document that contains the URL.

Site relative URL: A URL that specifies a location relative to the current server. Example: /images/logo.gif.

Document relative URL: A URL that specifies a location relative to the document in which the URL appears. Often, but not always, document relative URLs start with two dots and a slash ("../"). Example: ../logo.gif.

Template relative URL: A URL within a template file that specifies a location relative to the template file in the web publishing system. A template relative URL is a type of document relative URL.

Page relative URL: A URL that specifies a location relative to a merged page in the web publishing system. A page relative URL is a type of document relative URL, and is identified as a page relative URL by a marking code.

System relative URL: A URL that specifies a location relative to the site base that will contain the web page. A system relative URL is a type of document relative URL, and is identified as a system relative URL by a marking code.

Same page link URL: A URL that specifies a location on the same web page that contains the same page link URL.

Local publish/local stage: A publish or stage, where the user server or staging server is part of the edit server, instead of a separate physical server. Certain URLs usually are modified when the templates and content files are combined for staging or publishing.

External publish/external stage: A publish or stage, where the user server or staging server is a separate server, instead of part of the edit server. Certain URLs usually are modified when the templates and content files are combined for staging or publishing.

Internal URL: A URL that references a file that is one of the files managed by the web publishing system.

External URL: A URL that references a file that is not one of the files managed by the web publishing system.

Link: A link can be a hyperlink, as commonly used in web pages, or another type of pointer or reference to a document or location within a document.

Web Publishing System:

FIG. 1(a) is a block diagram of a web publishing system 100 that allows a user to easily create and edit web pages that make up all or part of a web site. As the web pages move from one location to another, the web publishing system 100 automatically modifies URLs to function correctly. The system 100 includes an edit server 102. The edit server 102 stores web page template data, content data, and software and/or hardware instructions used to edit the web site. The edit server 102 also provides a user interface to an editing client 104 to allow the user to create and maintain the web site. The edit server 102 can be one server computer unit, or distributed over multiple computers.

The edit server 102 is connected to the editing client 104 via a network such as the Internet 106. When a user wishes to edit the web site, the user uses an editing client 104, in some embodiments a personal computer with a web browser, to access the edit server 102. The edit server 102 provides functionality to allow a user on an editing client 104 to access editing tools and a current, edited copy of the template and content files that comprise the web site. In some embodiments, the edit server 102 does this by sending information to the editing client 104 that is interpreted and displayed on the web browser of the editing client 104 and receiving user instructions from the editing client 104.

The edit server 102 stores the edited, updated version of the web site. However, this edited version is not available for general viewing until the changes are sent to the user server 110 where the actual web site resides for general use. The user server 110 can be a separate physical server, or can be a part of the edit server 102. The user server 110 can also be one server unit, or distributed over multiple computers.

Additionally, in some embodiments, the web publishing system 100 includes a staging server 108. The staging server 108 allows the user to preview the web site after editing and before the web site is sent to the user server 110 for general use. The staging server 108 can be a separate physical server, part of the user server 110, or part of the edit server 102. The staging server 108 can also be one server unit, or distributed over multiple computers. Staging is an optional step between editing the web site and publishing the web site.

The user server 110 is connected to the edit server 102. In one embodiment, the user server 110 is connected to the edit server 102 via the Internet 106. However, the user server 110 may be connected to the edit server 102 by other systems and methods. For example, other networks besides the Internet could also be used. The edit server 102, or alternatively the staging server 108, sends the web pages to the user server 110. The edit server 102 can send a single page, multiple pages, all pages that have been updated, or the whole web site to the user server 110 so that the user server 110 contains the most recent edition of the web site.

From the user server 110, the site is available to those who wish to view the pages. A plurality of viewing clients 112 may be connected to the user server 110 via the Internet 106. Viewing clients 112 view the web pages stored on the user server 110 via the Internet 106.

Figure 1B:
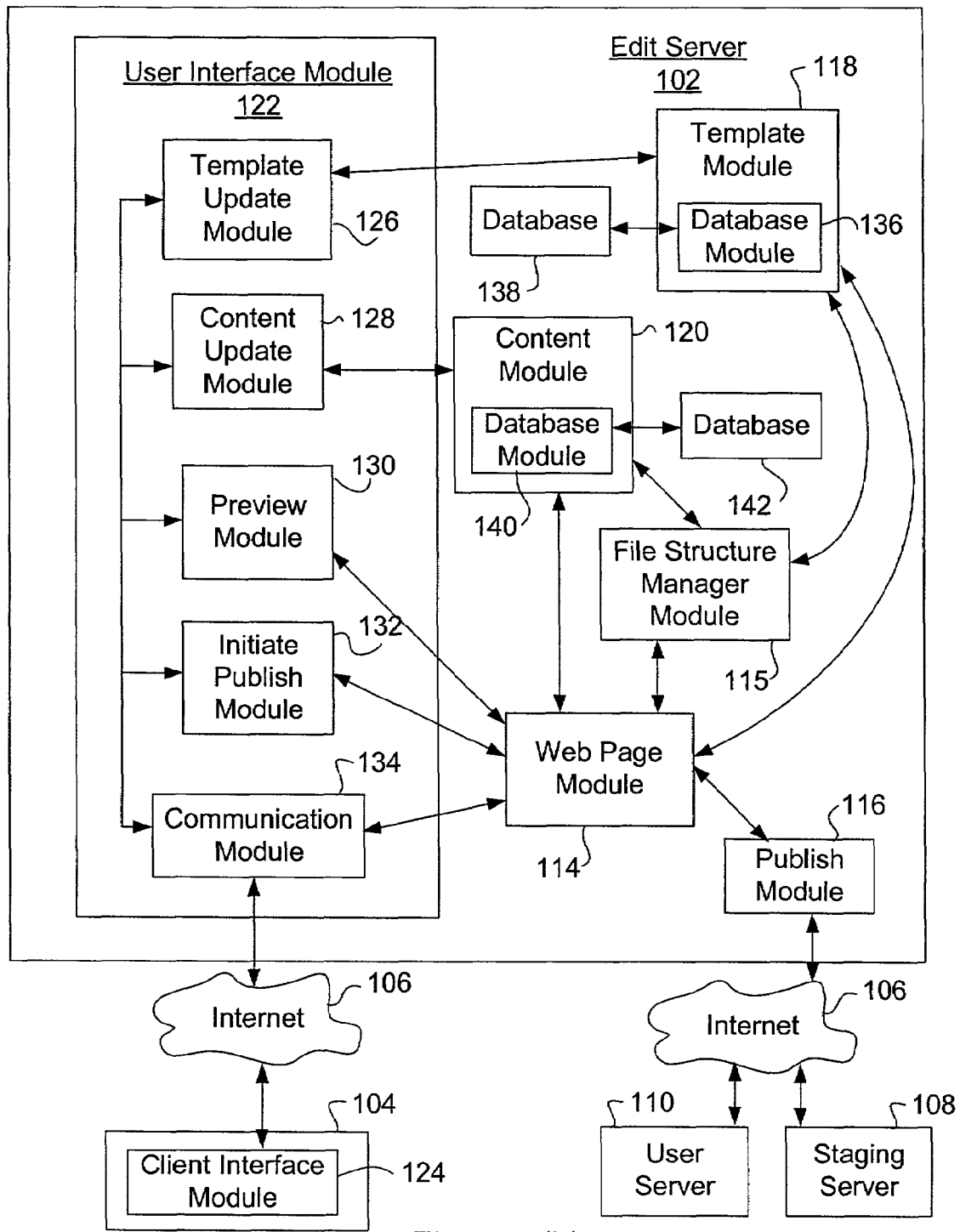
FIG. 1(b) is a block diagram showing more detail of the edit server and the editing client.

FIG. 1(b) is a block diagram showing more detail of the edit server 102 and the editing client 104. The edit server 102 includes a web page module 114, a publish module 116, a template module 118, a content module 120, a file structure manager module 115, and a user interface module 122. The user interface module 122 includes a template update module 126, a content update module 128, a preview module 130, an initiate publish module 132, and a communication module 134. The content module 120 includes a database module 140, which is connected to a database 142. The template module 118 also includes a database module 136, which is connected to a database 138. While the databases 138 and 142 are shown as being within the edit server 102, the databases 138 and 142 may also be located elsewhere. All templates and content files may also be stored in a single large database, rather than multiple databases. The editing client 104 includes a client interface module 124. The modules can be implemented in software, hardware, or firmware.

The user interface module 122 provides a user interface to the user via the client interface module 124 on the editing client 104. In some embodiments, the client interface module 124 is a web browser. The user interface module 122 passes data to the client interface module 124 and receives data from the client interface module 124. This data can take many forms, including HTML and other types of data. In embodiments, such as described herein, where the client interface module 124 is a web browser, the data will typically be in HTML format. The communication module 134 of the user interface module 122 sends HTML data to the client interface module 124. The HTML data is interpreted and displayed by the client interface module 124 to provide a user interface for the user. This user interface provides information to the user and allows the user to enter and send information to the edit server 102.

The user enters information defining or editing templates into the client interface module 124 of the editing client 104. The client interface module 124 displays a field into which the user may enter HTML code that defines the template. After the user enters the code, the client interface module 124 sends the code to the communication module 134 via the Internet 106. The communication module 134 directs the code to the template update module 126, which in turn sends the code to the template module 118. The template module 118 manages the templates in the database 138. If the template is a new template, the template module 118 stores the code in a database 138, via a database module 136. If the template is an edited version of a template that already exists, the template module 118 updates the template stored in the database 138, via the database module 136.

The user also enters information defining web page content into the client interface module 124. The client interface module 124 displays a field into which the user enters the content. After the user enters the content, the client interface module 124 sends the code to the communication module 134 via the Internet 106. The communication module 134 directs the code to the content update module 128, which in turn sends the code to the content module 120. The content module 120 manages the content files in the database 142 via the database module 140. If the received content is an edited update of existing content, the content module 120 updates the existing content in the database 142.

When the user creates template files or content files, the files are stored in an organizational structure. The file structure manager module 115 keeps track of the organization of the files, and also keeps track of when files are added, deleted or edited. Organizational structures can take the form of a folder and file system as is well known in the art and used with both Microsoft® Windows® operating systems and Apple® Mac OS® operating systems. The user defines the location of each template file, content file, and web page that results from the merging of a template file and content file. Content files can be treated as web pages for organizational purposes, since it is known which template the content files will be merged with to form the web pages. Thus, the content files can be treated as having the same location within the organizational structure as the web pages that will result from the merging of the template with that content file. When the user creates or edits a content file or template file, or merges a template file and content file to create a web page, the template module 118, content module 120, or web page module 114 notifies the file structure manager module 115 of the change. In some situations, when a file is changed, other files should be automatically changed as well. By keeping track of which files are changed, the file structure manager module 115 can notify the template module 118, content module 120 or web page module 114 to change the template file, content file, or web page as needed. The template module 118 or content module 120 can then automatically change the template file or content file in one of the databases 138 and 142, then the web page module 114 can automatically merge the changed template file and/or content file to create the updated web page.

When the user desires to view a web page while using the editing client 104, the user sends a request to the user interface module 122 via the client interface module 124 and the Internet 106. The user interface module 122 receives the request at the communication module 134, which sends the request to the preview module 130. The preview module 130 then sends a request to the web page module 114. The web page module 114 is a type of document module that handles web page documents. In other embodiments with other document types, the web page module 114 may be replaced with a document module specific to the type of document used. The web page module 114 retrieves the web page from cache or generates the web page by combining a template from the template module 118 and content from the content module 120 and delivers the web page to the preview module 130, which sends the web page to the communication module 134, which in turn passes the web page to the client interface module 124 for the user to view.

When the user desires to view the current version of the web site on either the staging server 108 or the user server 110, the user sends a request to the user interface module 122 via the client interface module 124 and the Internet 106. The user interface module 122 receives the request at the communication module 134, which sends the request to the initiate publish module 132. The initiate publish module 132 then sends the request to the web page module 114. The web page module 114 delivers the web page to the publish module 116, which in turn passes the web page to either the staging server 108 or the user server 110, depending on the user's request.

To deliver a web page to the preview module 130 or the publish module 116, the web page module 114 combines a template from the template module 118 and content from the content module 120. Alternatively, the template and content are retrieved from cache. When a template and content are merged to form a web page, that web page is cached. If neither the template nor the content has been changed since the last time the template and content were merged to form the web page, the merged web page is retrieved from cache instead of combined again. When a new or edited template or content file is sent to the template module 118 or content module 120, the template module 118 or content module 120 notifies the web page module 114 so that the web page module 114 is able to track whether the web page may be retrieved from cache, or should be created from combining template and content.

Typically, the template and content each contain URLs. The web page that the web page module 114 forms from the combination of the template and content also contains URLs. The web page may be at a different location than the template and content. In order for the URLs in the web page to function correctly, the web page module 114 modifies the URLs in the web page. The manner in which URLs are modified depends on whether the web page will be sent to the client interface module 124, the user server 110, or the staging server 108. After combining the template and content, the web page module 114 sends the web page with modified URLs to the publish module 116, to be sent to the user server 110 or the staging server 108, or to the preview module 130, to be sent to the client interface module 124.

Figure 2:
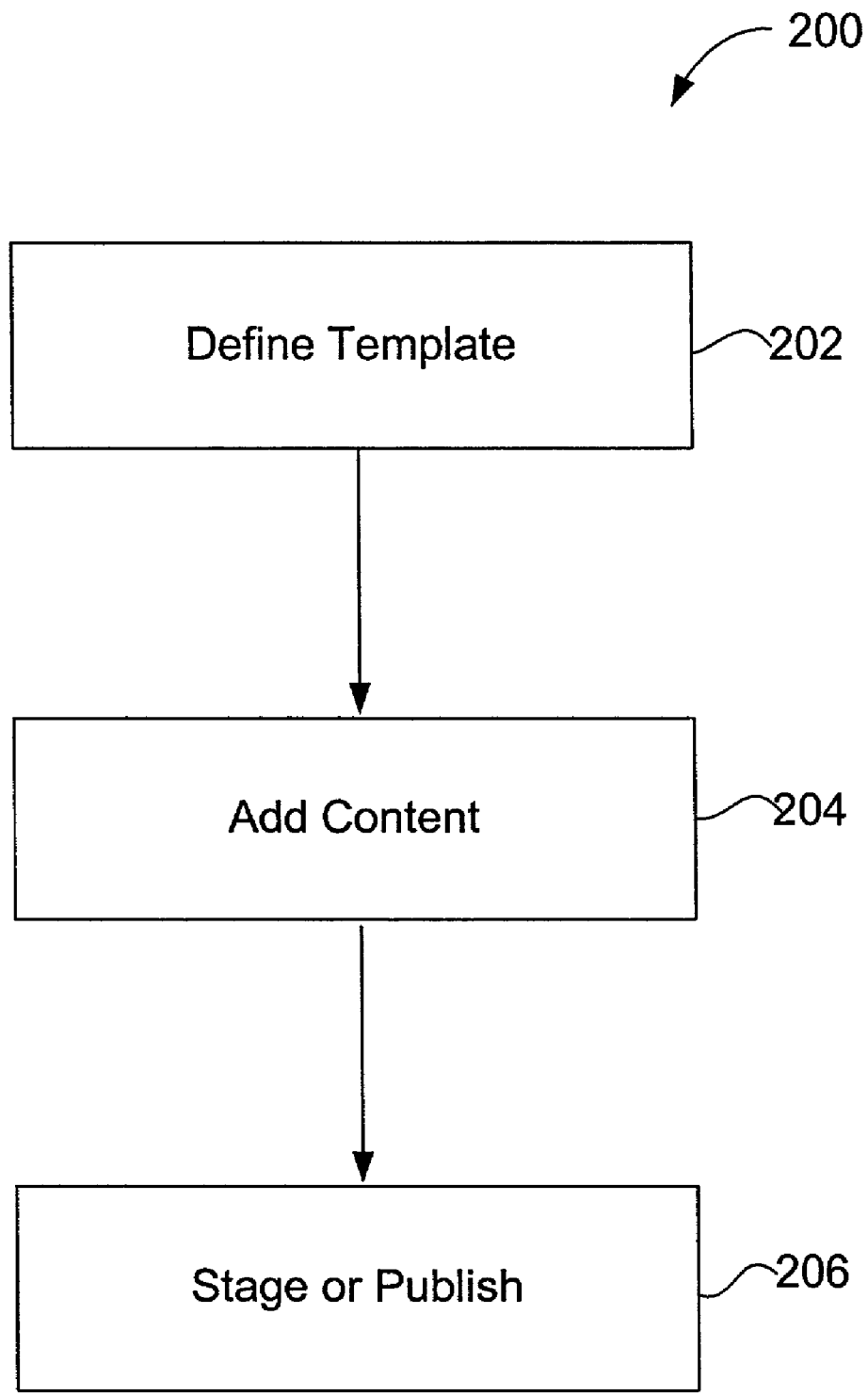
FIG. 2 is a flow chart showing how the user creates, edits and maintains the web site.

Web Page Creation and Editing Overview:

FIG. 2 is a flow chart 200 showing a summary overview of how the user creates, edits and maintains the web site. The user first creates 202 a template. The template is a file that defines a general look and feel for web pages based off that template. This simplifies the creation of web sites comprised of multiple web pages with a same general look and feel. The user interface module 122 provides an interface to the client interface module 124 to allow the user to create the template. After creation of the template, one or more web pages will be created from that template.

In some embodiments, there are different user levels. Higher level users have access to more of the system functions than lower level users. For example, higher level users create the templates, while lower level users do not have the ability to create templates. Higher level users also may organize the files of the web site and define what functions a lower level user may use.

The template defines aspects that will appear in every web page based on that template. Typically, the template will define a general "look and feel" for web pages based on that template. However, web pages based on the template also have aspects that differ from web page to web page. The content provides the aspects of a web page that are different from the other web pages based on the template. When creating the template, the user defines what aspects will differ in web pages based on the template. The user defines where content can be inserted, and what kind of content can be inserted in web pages based on the template. The use of templates makes it easy to ensure a uniform look and feel across a web site because the template defines much of each page based on it.

In some embodiments, the user creates the template using HTML code. Special tags define such things as what items are editable when creating pages based on the template and what items remain constant for all pages based on the template. There are also special marking codes for certain URL types. Some of the special tags used (in addition to standard HTML) to create the template in one embodiment are found in Appendix I. The special tags are intermixed with industry standard HTML in the template. The combination of special tags and HTML coding defines the visual characteristics of the template and the associated content. The user can hand-code the HTML, or can use one of any number of commercial products that allow a user to easily define the look of a page and automatically generate the actual markup language code. The user may have to add the special tags to the code generated by the commercial product, if the commercial product only generates standard HTML code. Alternatively, the commercial products themselves may include functionality to add the special tags automatically. In one embodiment, if a commercial product generates the HTML code, the user then cuts and pastes the code into the template. Alternatively, the commercial product interfaces with the template module 118 and directly stores the generated code in the template file. After the user creates the template, the template is stored in the template module 118. The user may preview the template while editing to check that the user has coded the template correctly.

After the template has been created, the user adds 204 content to create web pages based on that template. Typically, lower level users are restricted to doing this. During the creation of the template, the higher level user utilized special tags to define editable sections of the template. These editable sections of the template define the locations and types of content that may be entered. When creating the web pages, the editable sections of the template are marked. The user then enters content for insertion into the editable sections. Thus, the lower level user may only enter content that has a limited effect on the final web page and web site.

Little to no knowledge of HTML is needed when entering content. Thus, users with little technical skill can be designated as lower level users, where they may enter content to create web pages, with little fear their limited skills would lead them to make a mistake and cause problems with the web pages or web site. Since the higher level users define what the lower level users are able to do, the more skilled higher level users may retain control over most of the web site and web pages, while allowing less skilled lower level users to do some of the work of creating and modifying web pages. The user interface provided to the editing client 104 when creating web pages shows the template with symbols marking sections that the user can edit. The user selects a symbol and is presented with an area in which to enter the content along with prompts as to what content to enter. The user enters in the text or otherwise defines information that the user desires to be included as content in that page. The information can include pictures, audio files, video files, or other information. The content entered is stored in a content file associated with the template. By selecting the edit symbols and entering the information, the user adds the content that differentiates a particular web page from other web pages based on the template.

The user can use the same template and enter different sets of content to create several different web pages based on that template. On the edit server 102, the content, which includes the information the user has entered that is relevant to a single web page, is stored separately from the template as a content file. This content file contains the information (in some embodiments, the information is raw data such as ASCII text) representative of what the user entered into the editable sections of a template. The combination of content and template makes up the actual web page. Thus, if several web pages are based on a single template, multiple content files related to that template are created and stored. To generate the actual web pages, each content file is merged with the related template file.

The content differentiates the web page based on a particular template, but the overall look and feel of all the web pages based on that template remains the same. For example, there could be a template for a company's products. This template includes the company's logo and links to other pages as aspects common to all web pages based on the template. The template further includes an area for a product name and an area for a product description as the editable sections, which are the aspects than can change for each web page based on the template. Thus, when the user enters content, the user simply types in the product name and the product description.

Each time the user enters and saves another content file containing the product name and description, the user is, in effect, creating another web page. Each page includes both the aspects common to all web pages, provided by the template, and the aspects specific to that particular web page, provided by the content. The end result is several different pages for the several different products, each of the pages being uniform except for the information specific to that product.

Once the user has created or changed the web pages, the new or updated web pages are "staged" or "published" by sending 206 the web pages to the staging server 108 or the user server 110. "Staging" means that the templates are merged with the content files to form the web pages, and the web pages are placed on the staging server 108 so that the user can review the entire site before sending the site to the user server 110. As stated previously, the staging server 108 can be a separate physical server, a portion of the physical edit server 102, or a portion of the physical user server 110. The addresses of web pages on the staging server 108 are different than the locations of the web pages on the edit server 102 or the user server 110.

"Publishing" means that the templates are merged with the content files to form the web pages, and the web pages are placed on the user server 110 for normal use. As stated previously, the user server 110 can be a separate physical server or a portion of the edit server 102. Whether on a separate physical server, or on a portion of the edit server, the addresses of the web pages after publishing are different than the locations of the web pages on the edit server 102 or the staging server 108.

A web page can be located at several different addresses. The web page can be on the edit server 102 where it is viewed using the user interface, on a local staging server 108 or local user server 110, or on an external staging server 108 or external user server 110. If the web pages are being edited, or the staging server 108 or user server 110 are a portion of the edit server 102, their address will be defined in part by the location of the edit server 102 as well as the web page's location within the edit server 102. If the web page is published to a separate staging or user server, the web page's address will be defined by the address of the staging or user server and the location of the web page within the staging or user server. Thus, in some embodiments, the URLs are modified so that they function correctly when the web page containing the URLs are in each of the separate addresses.

In some embodiments, if the web pages are published to a user server 110 that is a separate physical server, the user has defined a "site base" for the web pages managed by the web publishing system 100. The site base is the root of the client's web site. For example, a client may have a web site with a root of, "http://www.client.com." This root, "http://www.client.com," would be specified by the user as the site base. In this example, a web page called "page.html" created by the web publishing system 100 and not being defined as within another directory would be located at "http://www.client.com/page.html" after publishing. If, during editing, a page "product1.html" were defined as being within the directory "products," the page would be located at "http://www.user.com/products/product1.html" after publishing. Thus, in some embodiments this site base defines at least part of the web pages' eventual address.

Figure 3A:
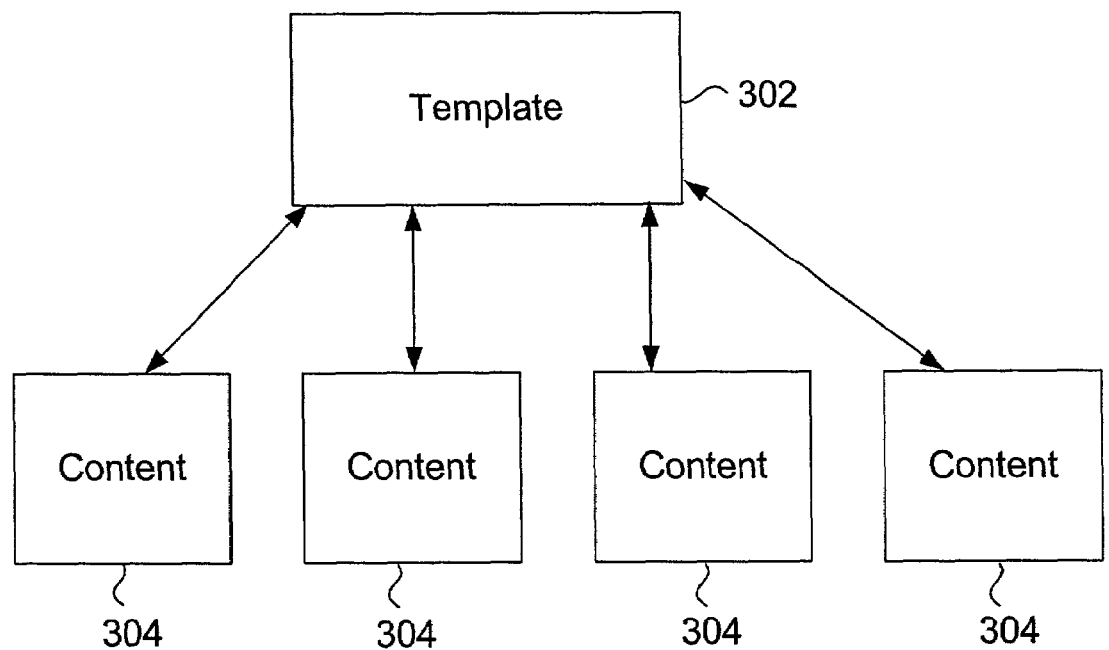
FIG. 3(a) is a block diagram of how the templates and web pages are stored on the edit server.

Templates and Content Files:

FIGS. 3(*a*) and 3(*b*) show in simple form how the web page information is stored before and after staging or publishing.

FIG. 3(*a*) is a block diagram illustrating how the templates and content files are stored on the edit server 102 prior to viewing on the editing client 104, staging, or publishing. On the edit server 102, the template file 302 is stored separately from the content file 304. The template file is created with HTML or other code in some embodiments. When the user creates or edits the template file, the communication module 134 receives the created or edited template from the client interface module 124 and sends the template to the template update module 126. The template update module 126 sends the template to the template module 118, where the template is either stored as a new template or, in the case of an edited template, a previously stored template is changed. The template module 118 also informs the web page module 114 when a template is edited. This alerts the web page module 114 to not use the cached version of web pages based on that template, since the cached version is out of date. Instead, when the web page module 114 receives a request for a web page based on that template, the web page module 114 will retrieve the template from the template module 118 and the content from the content module 120 and combine them to form the web page.

Each content file 304 contains the data added by the user to define a particular web page based on a template. As stated previously, as the user creates the template, the user defines where content information will be added. When the user creates or edits a content file, the communication module 134 receives the created or edited content from the client interface module 124 and sends the content, which in one embodiment is an ASCII text file, to the content update module 128. The content update module 128 sends the content to the content module 120, where the content is either stored as a new content file in the database 142 or, in the case of editing, a previously stored content file in the database 142 is changed. Additional information is stored to link each content file 304 with the proper template file 302. This information may be stored by the template module 118 in relation to the templates, in the content module 120 in relation to content files, in the file structure manager module 115 which stores a relationship between each template and content file, in another location, or in a combination of locations. The content module 120 also informs the web page module 114 when a content file is edited. This alerts the web page module 114 to not use the cached version of the web page that includes that content, since the cached version is out of date. Instead, when the web page module 114 receives a request for the web page including that content file, the web page module 114 will retrieve the content file from the content module 120 and the template from the template module 118 and combine them to form the web page.

By storing template file 302 separately from content files 304, the template can be modified once and, when the web page module 114 generates the web pages by combining the template and content files, the changes will affect every web page based on that template file 302.

In some cases, pages depend on other pages. For example a first page can include a list of links to several other pages, as well as the titles of those other pages. When the title of one of the other pages is changed, the title listed in the first page should also be changed. The system is capable of making such changes automatically. In some embodiments, when the title (or other aspect) of one of the other pages is changed, the content module 120 sends an alert to the web page module 114 and/or other modules in the system so that the first page will also be changed and the revised first page sent to the user server 110 when the revised other pages are sent. In other embodiments, the first page is changed to reflect the changed other pages only when the first page is formed from the template and content data. In yet other embodiments, both change systems are used.

Figure 3B:
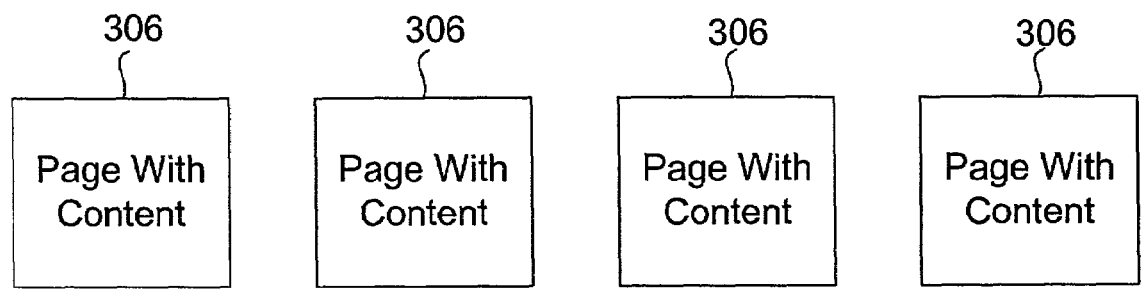
FIG. 3(b) is a block diagram of how the web pages are stored on the user server.

FIG. 3(b) is a block diagram of the web pages when viewed, staged or published. To initially form the web page 306, the web page module 114 merges a content file 304 from the content file 120 with a template file 302 from the template module 118 to form the web page 306. In some embodiments, the web page module 114 modifies URLs as the web page module 114 forms the web page 306. The web page module 114 modifies URLs differently based on whether the request came from the preview module 130 or the initiate publish module 132, and also on how the web page 306 will be viewed.

In some embodiments, when the web page module 114 forms the web page 306, the web page 306 is stored in cache. This allows the web page module 114 to later retrieve the web page 306 from cache. This provides greater efficiency than combining the template and content each time the web page is viewed, staged or published.

When the preview module 130 or the initiate publish module 132 requests the web page 306, the web page module 114 determines whether the web page 306 is stored in cache. If the web page is stored in cache, and no changes have been made to the content file 304 and the template file 302 that formed the web page 306, the web page module 114 retrieves the web page 306 from cache. However, if either the content file 304 or the template file 302 is changed, the content module 120 or the template module 118 notifies the web page module 114 so that the web page module 114 will not retrieve the web page based on that content file 304 or template file 302 from cache. Similarly if a first page with links or other information from other pages should be changed because one of the other pages has changed, the web page module 114 is notified when the other pages are changed and the web page module 114 will not retrieve the first web page from cache. Instead, the web page module 114 combines the template file 302 and content file 304 again. The web page 306 is then viewed through the client interface module 124, sent to the staging server 108, or sent to the user server 110.

Access Levels:

As mentioned above, there are higher level users and lower level users. Higher level users have access to more features and functionality of the system than lower level users. Higher level users create and modify templates and organize the file structure of the web site. Higher level users also define to what features and functionality the lower level users have access. In some embodiments, the higher level users and lower level users access the web publishing system 100 through different user interfaces (UIs). A first interface is for higher level users, and allows access to most or all features and functions, and a second interface is for lower level users, and allows access to fewer features and functions. More than two levels of UIs may also be used. In some embodiments, each user signs in to the web publishing system with a user name and a password, and the system automatically provides higher level users with the first UI, and lower level users with the second UI.

In some embodiments, one or more higher level users define which UI will be provided to each user, and what functionality is available through the UIs. For example, in some embodiments, users sign in to the web publishing system 100 with a user name and password. The higher level users have access to all possible functions through a first UI. The higher level users define functionality available to lower level users through one or more lower level UIs. The functionality can include allowing lower level users access to only part of the web publishing system, allowing lower level users to only enter content related to specified templates, allowing lower level users to access functionality only on certain dates or times, or other ways. In the example, the higher level users specify what functionality is available to each user by relating functionality to user name and password. The higher level user can specify a UI for a lower level user that would allow the lower level user to accomplish a specific task, such as creating a content file related to a template. Then, after creating the content file, the UI for the lower level user could prevent further action by that lower level user. Thus, the higher level user can set a "to do" list for lower level users, and specify a UI that allows the lower level user to accomplish the tasks in the "to do" list, and does not allow the lower level user access to any other functions.

In some embodiments, the higher level user defines the functionality of a UI for a lower level user to be used with a particular template when the higher level user creates that template. For example, the higher level user may define additional information that is to be provided to the lower level user when the lower level user enters content for that template. Further, the higher level user can define commands available for use with relation with a particular template.

For example, in some embodiments, the users interact with the web publishing system 100 through two user interfaces ("UI"s), the design UI and the task UI. The design UI is the UI for higher level users, and allows the user the ability to use any of the web publishing system's tools and functions. These functions include defining access levels for other users, creating, previewing, testing, and editing templates, creating and editing content files, and creating, previewing, testing, and editing pages. Because the design UI gives the user full access to all functions, it is normally be reserved for users such as web administrators and web designers.

The task UI provides limited functionality. The task UI is normally used by lower-level users who are only authorized to perform tasks, often defined by higher level users, such as editing the page content of specific pages. A web site administrator or similar higher level user determines which tasks a lower-level user may perform. Such lower-level users typically may not change a template, nor may they test the page by clicking on a hypertext link. Thus, the task UI keeps the lower-level user in a limited functionality area, where the functionality available to the lower level user is defined by the higher level user. For example, the lower-level user may only be able to perform the limited task of adding content to specified templates. These users do not have to use HTML or other complicated coding languages, so the task UI makes it easy for even users of limited skill to provide a valuable service and create web pages based on the templates. The user interface module 122 receives the definition of the functionality available to each user from the high level users, stores the functionality available to each user, and provides that functionality to the users when the users access the edit server 102 through the communication module 134.

Detail of Creating and Editing Web Pages:

FIGS. 4(*a*) through 4(*h*) are screen shots detailing how a user performs operations with the web publishing system 100, and illustrating how the web publishing system modifies URLs. As noted above, in some embodiments, the user interacts with the web publishing system 100 through two user interfaces ("UI"s), the design UI and the task UI. The user creates templates and content files, edits templates and content files, and performs other actions on the web site by using one of the two user interfaces. FIGS. 4(*a*) through 4(*f*) show the design UI. FIGS. 4(*g*) and 4(*h*) show the task UI. The task UI provides limited functionality.

Template Creation:

FIG. 4(*a*) is a screenshot detailing how a user defines a template. In a navigation area 402, the user can access a file organizational structure. This structure can be a file tree, with folder and file oration similar to that found on systems such as popular operating systems Microsoft® Windows® and Apple® Mac OS®. Other file organizational structures can also be used. With the navigation area 402, the user can navigate through the web pages and templates stored in the web publishing system 100, choose to edit existing pages and templates or create new pages and templates, and decide where within the organizational structure to store such templates and pages. A command area 404 provides additional functions available to the user.

In the embodiment shown, the user defines the template by entering HTML code in a template code area 406. This HTML code includes special tags, some examples of which are listed in Appendix A, below. As stated earlier, the user may hand-code the HTML that comprises the template, or use a commercial product that automatically generates the markup language code. While defining the template, the user includes code that sets the areas in which content will be added, and may also enter default content for these areas. As part of creating the template, the user also may enter many different types of URLs as part of the template code, including absolute URLs, template relative URLs, and other types of URLs.

There are also commands available to the user in the template code area 406. For example, the user can preview the template by clicking on the preview button 410, or save the template code by clicking on the save button 408 with a mouse.

When the user saves the template code, the client interface module 124 sends the template code to the communication module 134, which passes the template code to the template update module 126. The template update module 126 then passes the template code to the template module 118, which saves the code as a template file in the database 138.

FIG. 4(*b*) is a screenshot showing a template preview presented to the user after the user clicks on the preview button 410 of FIG. 4(*a*). After the user clicks on the preview button 410, the client interface module 124 sends a preview request to the communication module 134, which passes the request to the preview module 130. The preview module 130 then sends the request to the web page module 114. The web page module retrieves the template file from the template module 118. The web page module 114 then sends the template file to the communication module 134, which sends the template file to the client interface module 124. The client interface module 124 then displays the template. As the user is in the design UI when previewing a template, the template is displayed nearly the way it would appear as part of a web page generated from the template and a content file. However, instead of being combined with a content file to form the web page, default content 412 is used. The default content is typically created as part of the template file. The default content takes the place of user-entered content that would normally appear in a web page generated from combining the template and a content file. This allows the user to preview the template without having to also generate a sample content file, and shows where the content from the content file would go in web pages based on the template.

Instead of taking up the entire browser window as the final web page viewed from the user server 110 would, the previewed template is seen in a preview area 414. The template preview retains the navigation area 402 and the command area 404 so that the user may continue to edit the template. This allows the user editing the template to easily determine how the template will appear on a viewer's browser, whether the links, such as link 416, work correctly, and perform other tests, while remaining within the template creation and editing process and having other commands and functions easily available.

When previewing the template, the template is on the edit server 102. Eventually, web pages that will be generated from the template will be located on the user server 110 for normal use. This is a different location, either physically or logically, than the edit server 102. Thus, URLs in the template, particularly relative URLs in the template, are modified to be different when previewed than when viewing the web pages based on that template located on the user server 110. Otherwise, either the template preview or the web page on the user server 110 will not function correctly. Further, since the template preview does not take up the entire browser window, the template is targeted to the correct portion of the browser window.

Figure 4A:
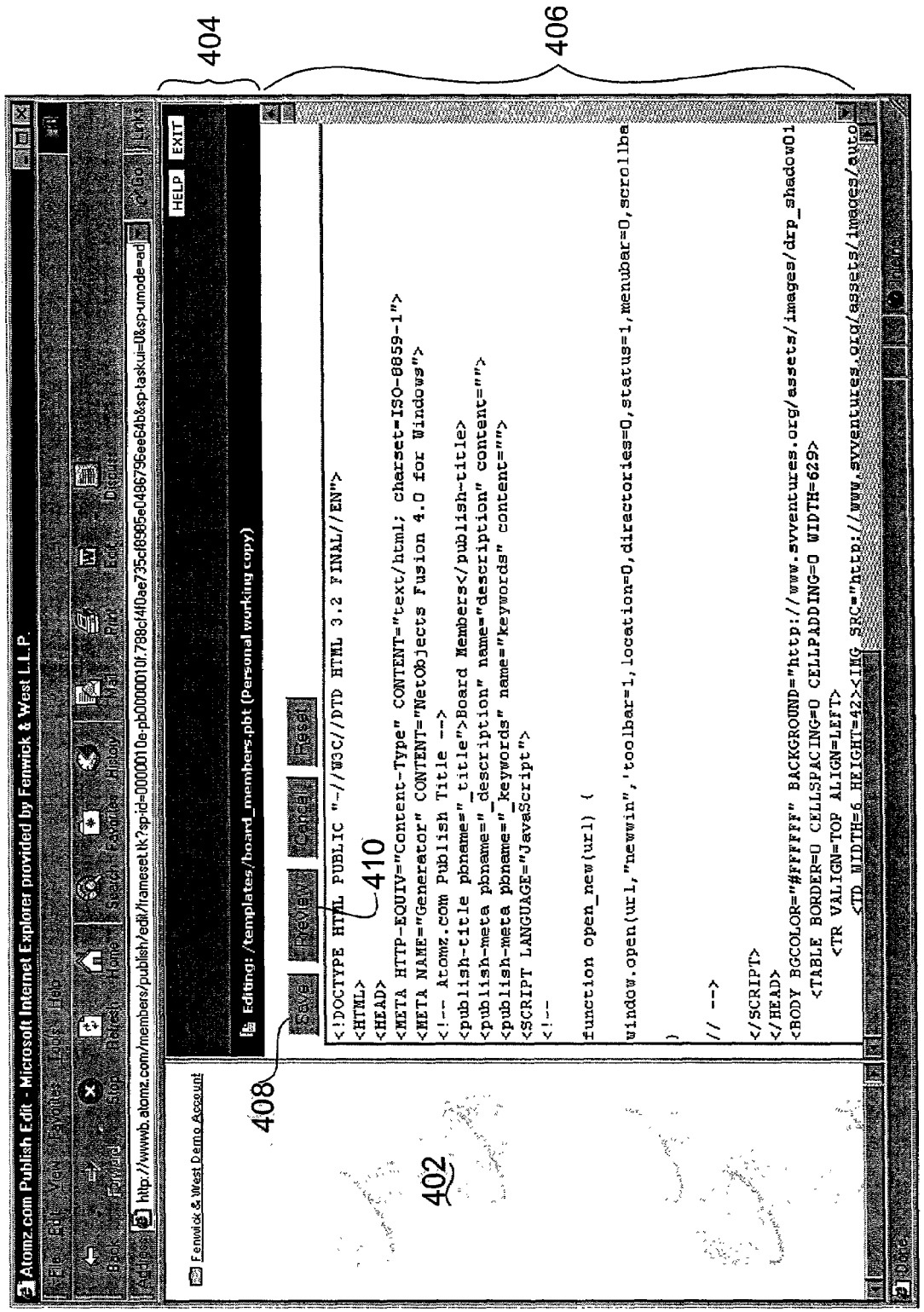
FIG. 4(a) is a screenshot showing the step of defining a template in more detail.
Figure 4B:
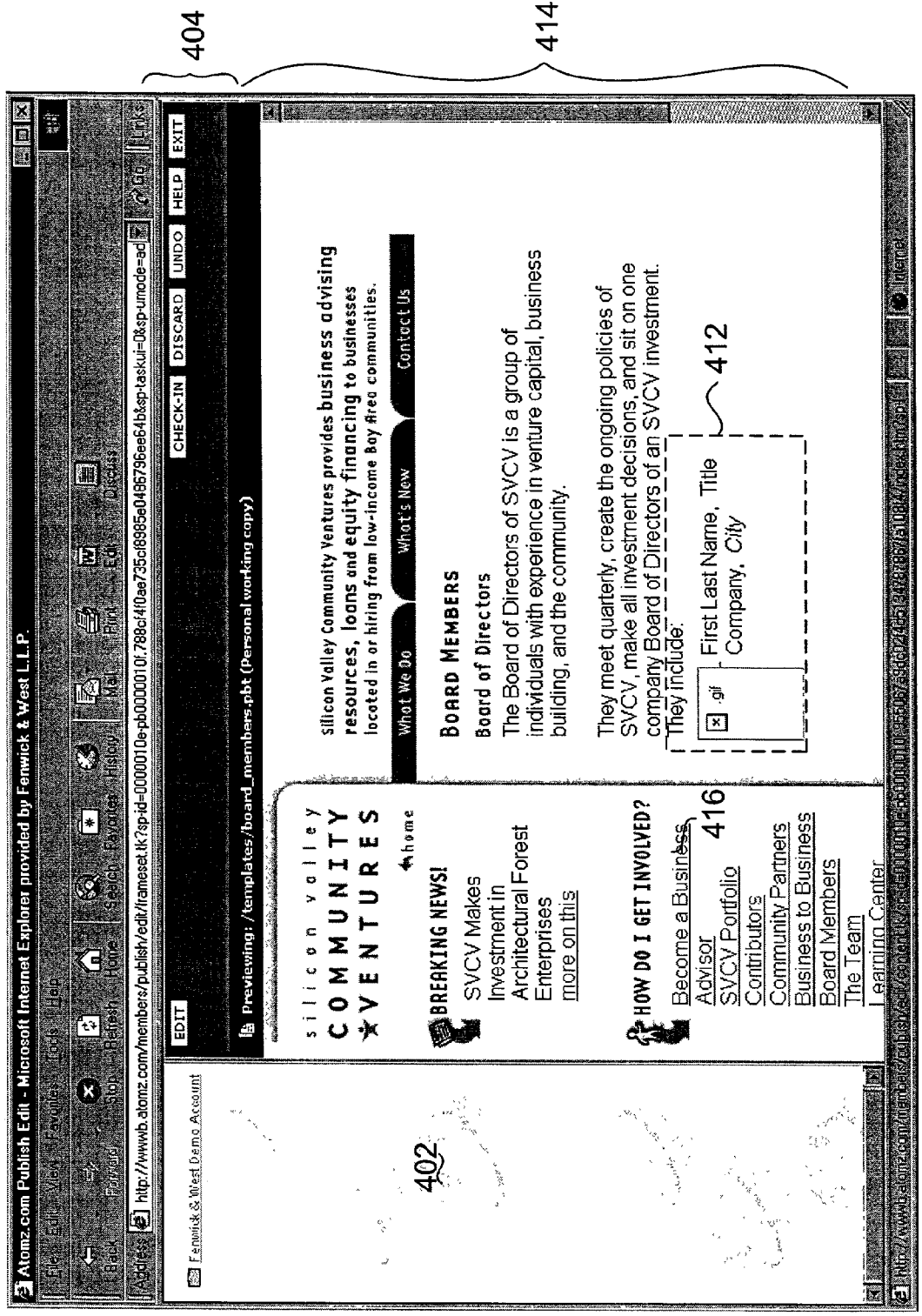
FIG. 4(b) is a screenshot showing a template preview.
Figure 4C:
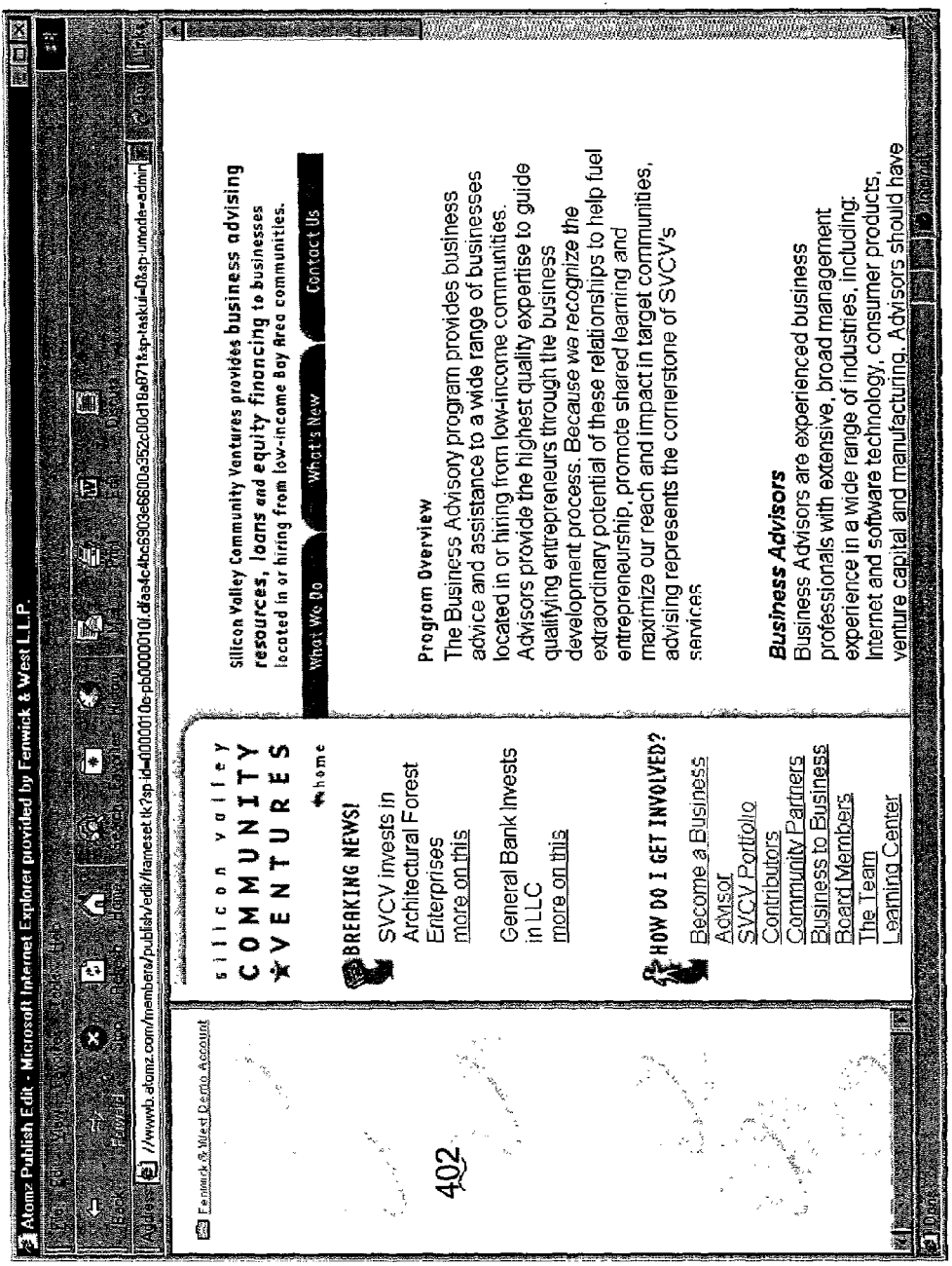
FIG. 4(c) is a screenshot of a template link test.

FIG. 4(c) is a screenshot of a template link preview. A user may test links in a previewed template by selecting the links to determine whether they function correctly. After selecting link 416 of the template preview of FIG. 4(b), the linked page 418 appears in the browser window. The linked web page shown in FIG. 4(c) is not part of the web site managed by the web publishing system 100. Such a page from another site, not part of the web site managed by the web publishing system 100, is an external web page. When a link test brings up an external web page as seen in FIG. 4(c), the navigation area 402 remains, but the command area 404 does not appear. Instead, the linked external web page 418 covers the rest of the browser window. The command area 404 does not appear since the user may not edit the linked external page 418. By not providing a command area 404 relevant to the linked page, the web publishing system 100 reminds the user that the user is just previewing the link of the template, and may not edit the page. This helps prevent the user from getting confused and attempting to edit the linked page 418. In order for the linked external page 418 to appear in the correct portion of the browser window, the URL of the linked external page 418 is targeted to the desired portion of the browser window.

The user may also test a link 416 for a web page that is part of the web site managed by the web publishing system 100. A web page managed by the web publishing system is an internal web page. When the user tests a link to an internal web page, both the navigation area 402 and the command area 404 remain. The internal web page appears in the same portion of the browser window that the template preview was displayed in. The command area 404 remains since the user may edit the linked internal page. Just as with the external page, the internal web page is targeted to the correct portion of the browser window.

Figure 4D:
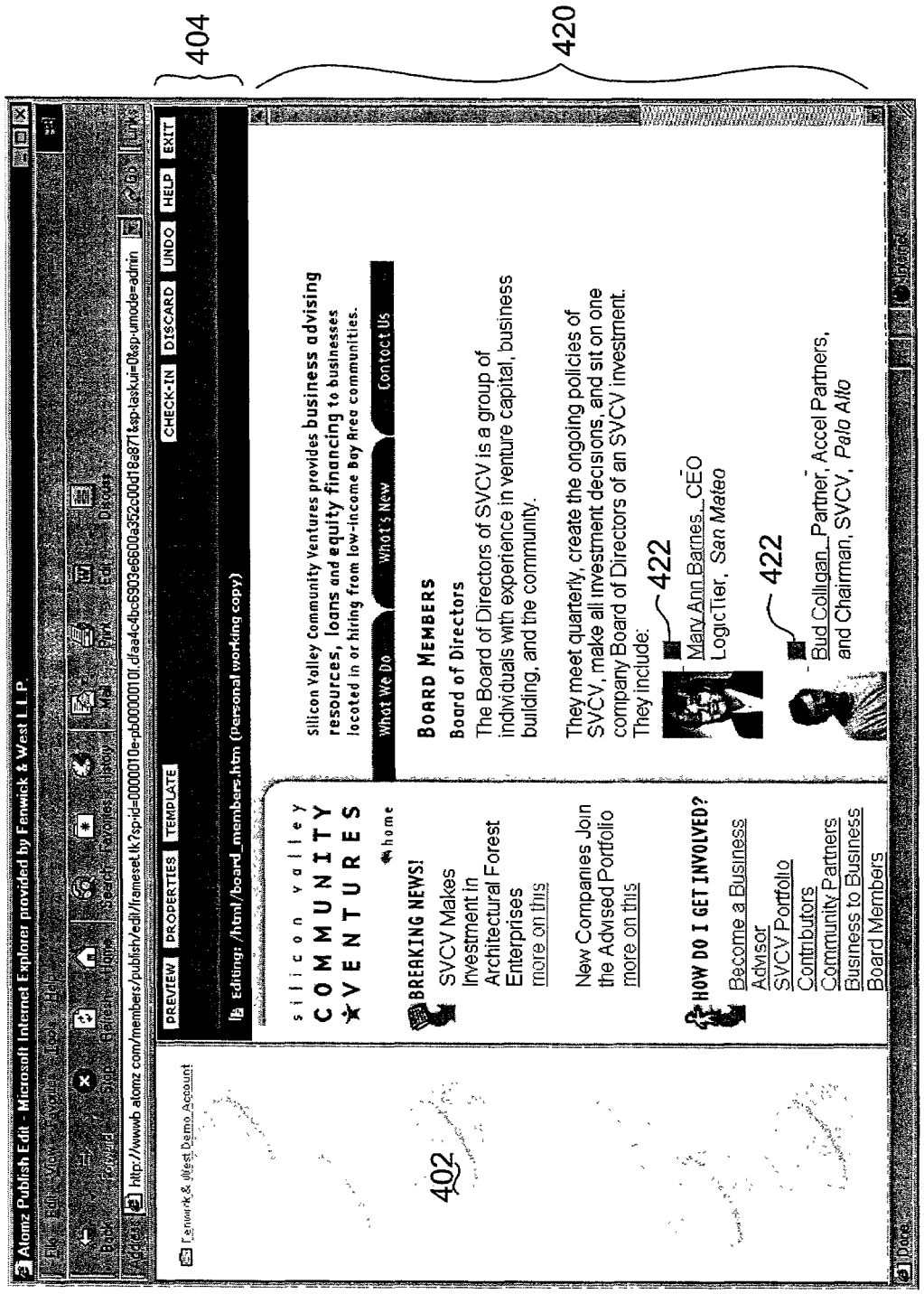
FIG. 4(d) is a screenshot showing how to perform the step of making pages in more detail.

Content Creation, Design UI:

FIG. 4(d) is a screenshot showing how to create or edit web pages once the template has been created. FIG. 4(d) shows the design UI, although a user can edit pages using either the design UI or the task UI. When creating a web page, the user creates an instance of the template that includes content specific to that web page. This content added by the user is saved as a content file related to the template. When creating a page, the user sees almost the same information as when previewing a template. The browser window includes a navigation area 402 and a command area 404. Where the template preview included a preview area, the page edit includes a web page area 420. The particular web page area 420 shown in FIG. 4(d) displays a page that has already been created and has content added. A comparison of FIG. 4(d) to FIG. 4(b) shows that the default content of the template preview (FIG. 4(b)) has been replaced by content in the web page preview (FIG. 4(d)). To display the web page shown in FIG. 4(d), the client interface module 124 sends a request to the communication module 134, which passes the request to the preview module 130. The preview module 130 then sends the request to the web page module 114. The web page module 114 combines the template file from the template module 118 with the content file from the content module 120. When generating a web page for the page editing view, the web page module 114 includes the page edit symbols 422. The web page module 114 then returns the web page to the communication module 134, which sends it to the client interface module 124 for display.

The user adds content by selecting editable areas on the screen of FIG. 4(d). When the user created the template, the user defined areas of the template where content will be added to each page. Each of these areas is marked by the page edit symbol 422 in the page editing view. To add content and create a page, or to add information or edit an existing content file, the user selects the page edit symbol 422.

As with FIG. 4(b), in FIG. 4(d) the web page in the web page area 420 has a different URL and location than the template on which the web page is based. Thus, URLs in the template, particularly the various relative URLs in the template, are modified to be different in the template than the corresponding URLs in the web page based on that template so that both the web page and the template preview function correctly. Further, the web page is targeted to the correct portion of the browser window.

Figure 4E:
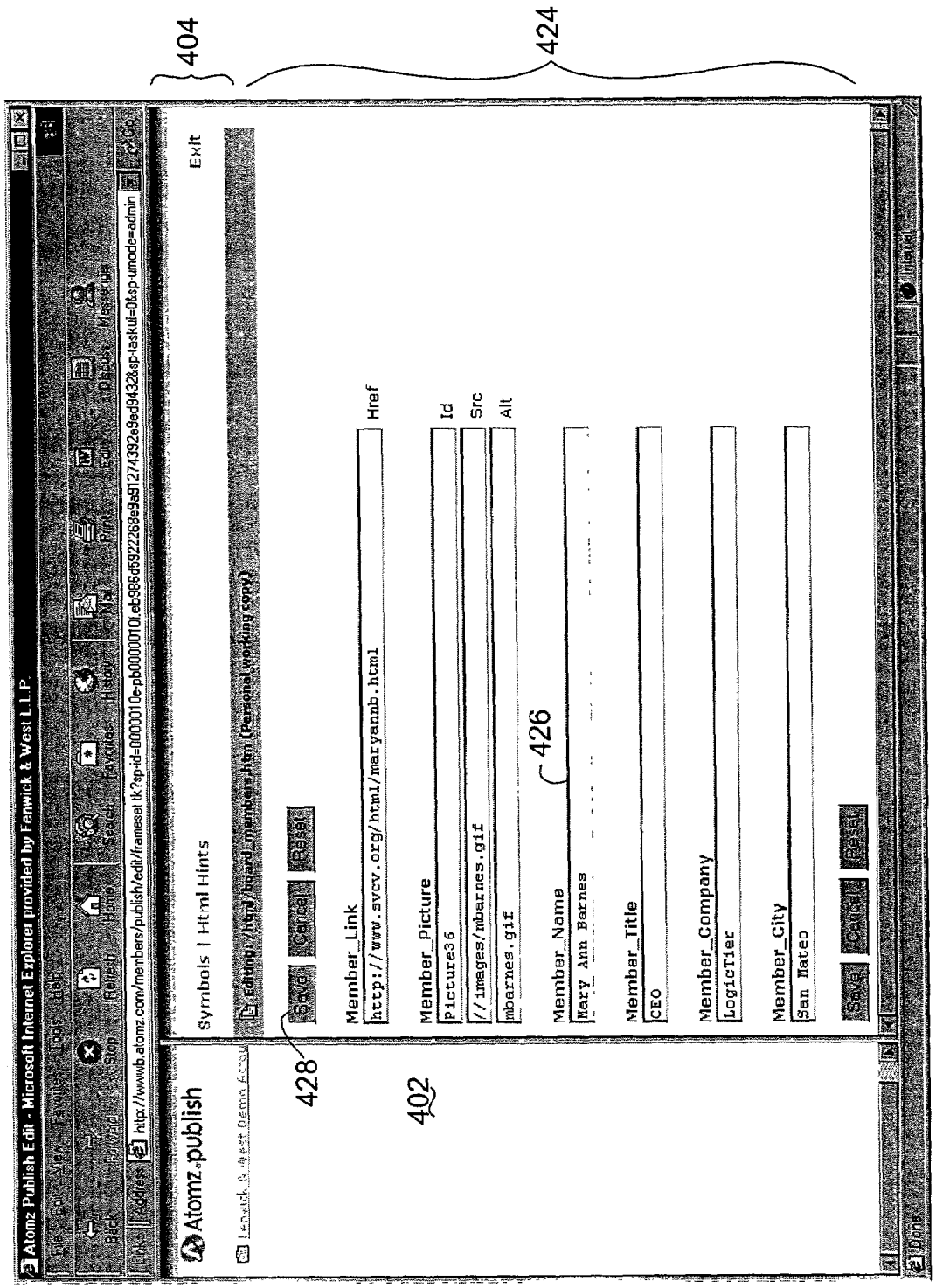
FIG. 4(e) is a screenshot showing how a user enters content into a page.

FIG. 4(e) is a screenshot showing how a user enters content to create a content file for a web page after selecting the page edit symbol 422. The content entering screen includes the navigation area 402 and command area 404, as well as a content entering area 424. Information on the content entering screen also shows the identity and location within the file structure of the page for which the content is entered. The user may define where in the file structure the page based on the content will be stored, or may define where all pages based on a certain template will be stored. In different embodiments, this can be done when the template associated with the content files is created, when the content file is created, or at other times through use of the file stuck manager module 115 to govern the overall file structure. A user needs little or no knowledge of HTML to enter content to create a content file for a web page. In the example of FIG. 4(e), the user simply types the information into labeled fields. The information entered in this page forms the content file of a web page, as opposed to the template information that is common to each page based on that template. For example, in the field labeled "Member_Name" 426, the user types in a name. As seen in FIG. 4(e), this is a straightforward operation. After typing in all the content, the user clicks on the "Save" button 428. This causes the client interface module 124 to send the content information that the user entered to the communication module 134. The communication module 134 sends the content information, in the form of a content file, to the content update module 128. The content update module 128 then sends the content file to the content module 120, where the content file is stored in the database 142. The user can also delete or edit the content on this screen and save the revised content. Thus, creation and editing of the web pages is a very simple task.

Figure 4F:
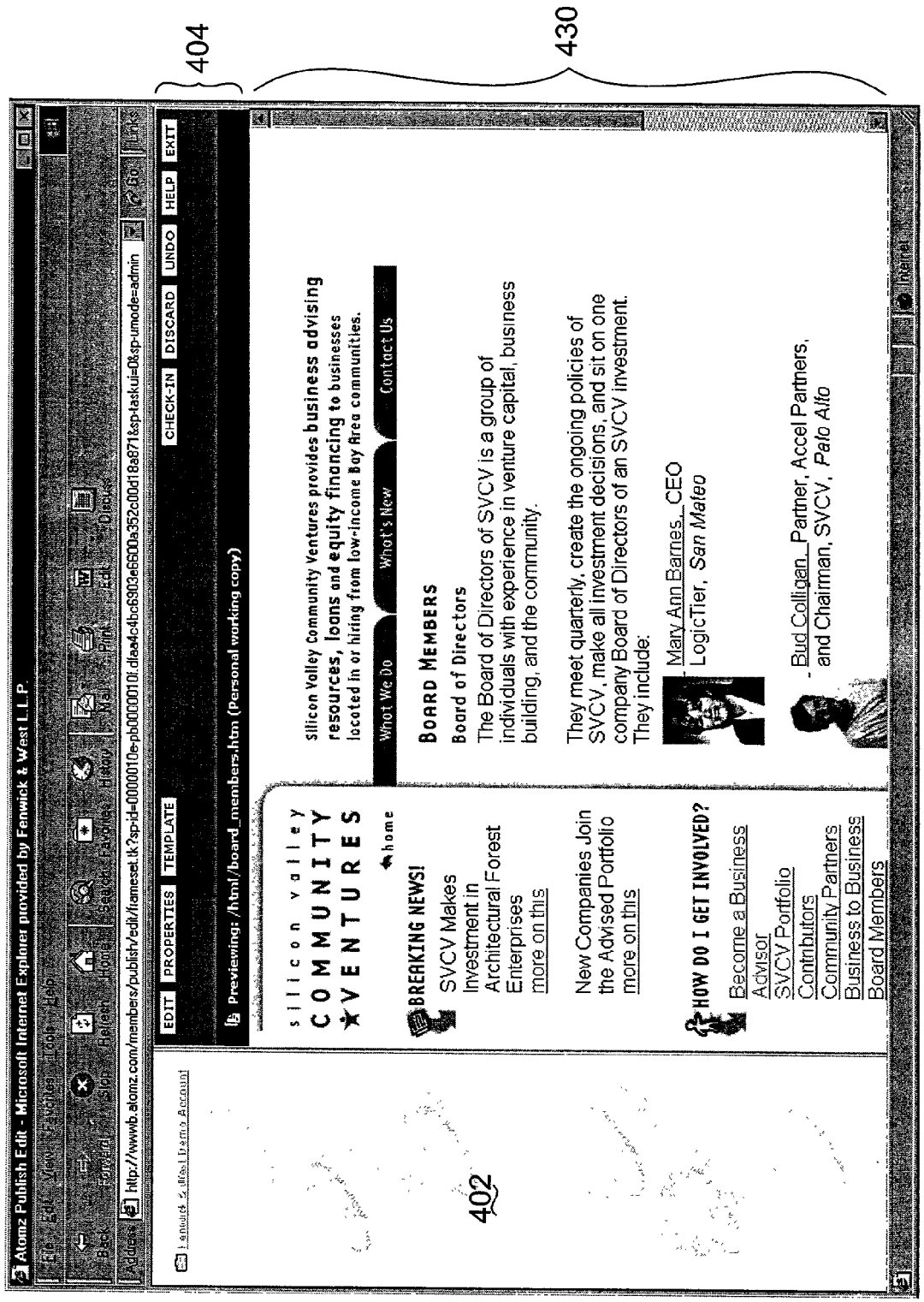
FIG. 4(f) is a screenshot showing a page preview.

FIG. 4(f) is a screenshot showing a page preview. After the content is entered into a page, the user may preview the page to ensure it looks correct. A page preview, as shown in FIG. 4(f), is similar to a template preview, shown in FIG. 4(c). However, in the page preview, the web page displayed includes the template file combined with the content file for the web page, instead of just default content. To preview the page, the web page module 114 merges the template file from the template module 118 with the content file from the content module 120 to form the web page. The web page module 114 then sends the web page to the communication module 134. The communication module 134 sends the web page to the client interface module 124, which displays the web page for the user.

When using the design UI, the user may perform tests such as checking the links to make sure they function correctly. As when previewing the template, when previewing the page the design UI presents the user with the page the way it would be seen in a web browser, with the exception that the previewed page is seen in a page preview area 430 instead of the entire browser window. The page preview retains the navigation area 402 and the command area 404 so that the user may continue to edit the page. The page preview allows the user editing the page to determine how the page will appear on a viewer's browser, whether the links work correctly, and perform other tests, while remaining within the page creation and editing process.

As with FIG. 4(d), in FIG. 4(f) the web page seen in the page preview area 430 has a different location than the template on which the web page is based. Thus, URLs in the template, particularly relative URLs in the template, are modified to be different in the template than the corresponding URLs in the web page based on that template so that both the web page and the template preview function correctly. Further, the web page is targeted to the correct portion of the browser window.

If an external link were selected, the external web page would be displayed in a different portion of the browser window. The navigation area 402 would remain, but the command area 404 would not. This prevents the user from becoming confused and attempting to edit the external web page.

Figure 4G:
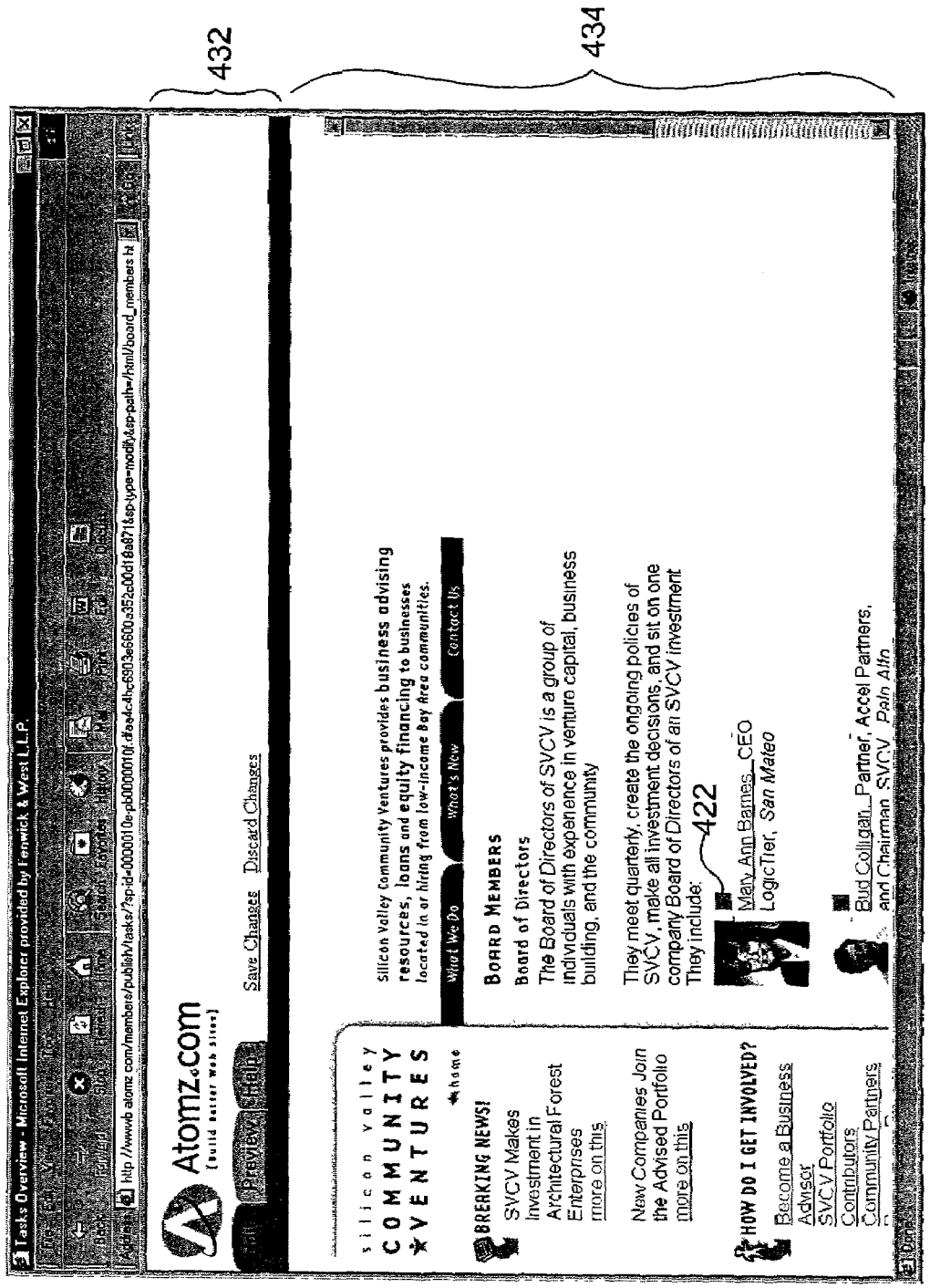
FIG. 4(g) is a screenshot showing how to create or edit a page using the task UI.

Content Creation, Task UI:

FIG. 4(g) is a screenshot illustrating how the user creates or edits a page using the task UI. The task UI only provides limited functionality. This limited functionality can be defined by a higher level user, or the system can have predetermined function sets available to each level of user. The task UI is normally used by lower-level users who are authorized to perform specific tasks such as adding page content to specific pages. The administrators determine which tasks a lower-level user may perform. The task UI does not allow a user to change the template or test the page by clicking on a hypertext link. If a user clicks on a link, the web publishing system 100 will present the user with a message stating that the links have been disabled. To do this, when the web page module 114 combines the template file and content file, the web page module 114 modifies the URL of the link so that the linked page is not loaded. Instead, the link URL is modified so a message indicating the links have been disabled is loaded.

Thus, the task UI keeps the lower-level user in a limited functionality area where the lower-level user can only perform limited tasks such as adding content to web pages. Users who access the web publishing system 100 through the task UI typically know little or no HTML. Thus, these users do not have access to the underlying template markup language code.

In keeping with its limited functionality, the task UI does not present the user with as much information as the design UI does. The task UI includes a task command area 432 and a page edit area 434. The page edit area 434 in the task UI includes the same information, including the same page edit symbols, as the page area 420 shown in FIG. 4(d).

To display the page in the page edit area 434, the web page module 114 merges the template with that page's specific content file. The web page module 114 also modifies the URLs in the template and content files as needed.

To edit and add content to the page, the user selects the page edit symbol 422. The user then enters content in the same manner as shown in FIG. 4(e), with the exception that in the task UI, neither the navigation area 402 nor the command area 404 is displayed. Instead, the content entering area 424 is the only area shown in the user's browser window. The higher level user defined the content fields when the higher level user created the template file. Just as in the design UI, the content added by the user is saved in the content file for that page.

Figure 4H:
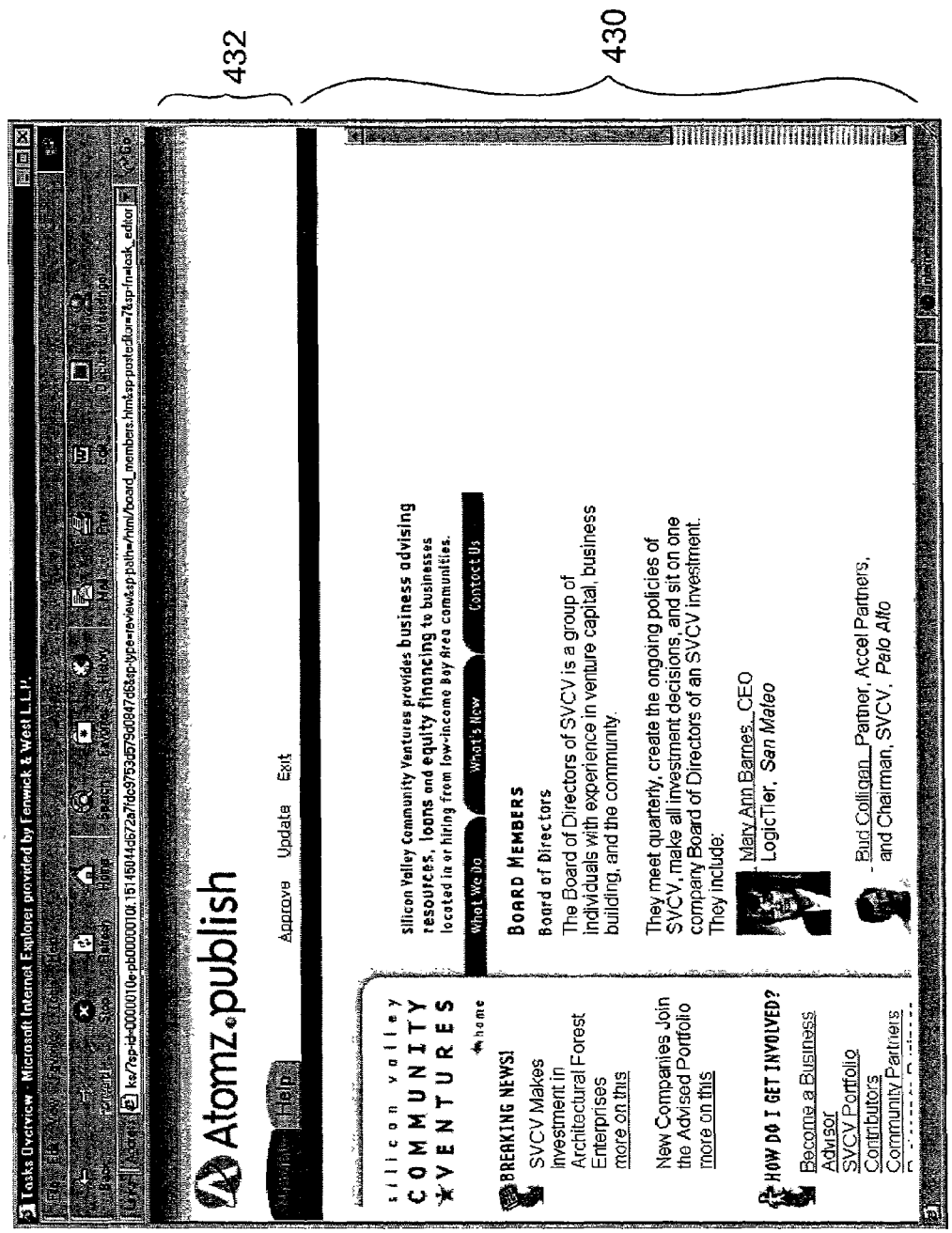
FIG. 4(h) is a screenshot showing a page preview using the task UI.

FIG. 4(h) is a screenshot showing a page preview using the task UI. To provide the page preview, the web publishing system 100 combines the content file for that page with the template. The page preview of the task UI presents the user with a task command area 432 and a page preview area 430. The page preview in the task UI provides the limited functions of giving a user the ability to determine how the page currently being edited would appear on a viewer's browser. Since the task UI provides limited functionality, the page preview in the task UI does not include a navigation area 402. The task UI also does not allow a user to change the template or test the page by clicking on a hypertext link. If a user clicks on a link, the web publishing system 100 will present the user with a message stating that the links have been disabled. To do this, the web page module 114 modifies the URL of the link so that the linked page is not loaded. Instead, the web page module 114 modifies the link URL so a message indicating the links have been disabled is loaded.

URL Modification:

In some embodiments, the web publishing system 100 includes functionality for modifying URLs or other indirect addresses. As is apparent from the discussion above, the web page module 114 of the web publishing system 100 may modify URLs in many different situations. The user typically enters many different URLs of different types during the creation of the template or content. The URLs from both template and content are modified based on the type of URL, what context the web page exists in, and which UI is being used by the user.

Figure 5:
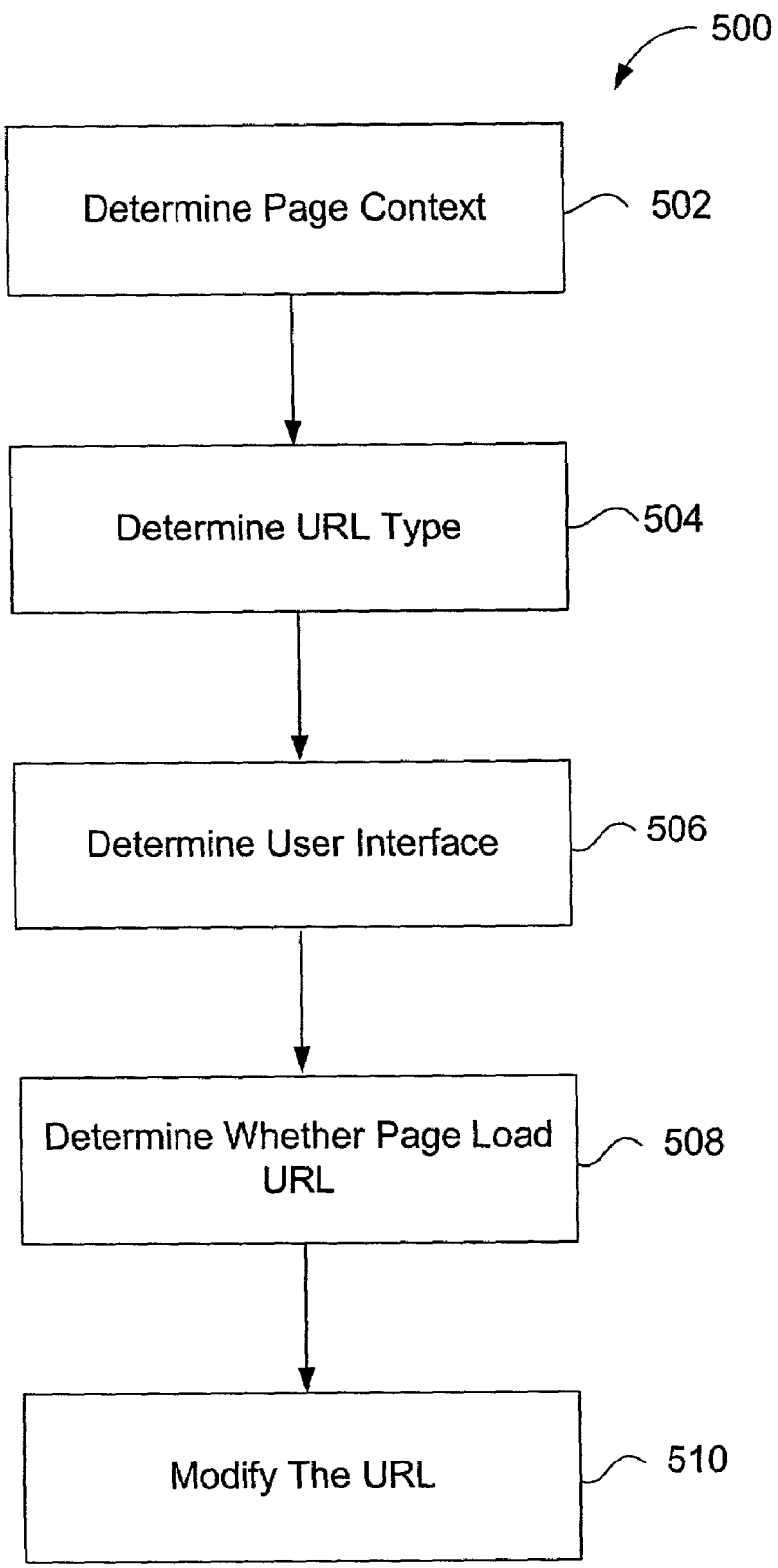
FIG. 5 is a flow chart show the URL modification process.

FIG. 5 is a flow chart showing a URL modification process 500. When a template and content are combined, the web page module 114 modifies the URLs in the resulting web page as needed. The web page module 114 determines the context 502 in which the web page will appear. There are four contexts: template preview, page preview, local stage or publish, and external stage or publish.

A template preview shows a preview of the template. A page preview shows a preview of the web page. Thus, the page preview includes both the template and content. The user views the template preview or the page preview via one of the two user interfaces, the design UI or the task UI. When viewed via one of the user interfaces, the previewed template or page is located on the edit server 102. FIG. 4(b) shows a template preview, and FIGS. 4(d), 4(f), 4(g), and 4(h) show page previews.

When a web page is staged or published, either locally or externally, the web page is not viewed via the user interface. Rather, the web page module 114 forms the web page by combining the template and content, and then sends the web page via the publish module 116 to the staging server 108 or the user server 110. From the staging server 108 or the user server 110, the web page is viewed by viewing clients 112. Thus, under the local and external staging and publishing contexts, the location of the web page depends on the location of the staging server 108 or the user server 110.

The web page module 114 also determines the URL type 504 of each URL within the content file and template file that make up the web page. There are six URL types: absolute, site relative, template relative, page relative, system relative, and same page link. The web page module 114 determines the URL type because the six URL types are modified in different ways.

The web page module 114 determines the user interface 506 (design UI or task UI), if any, used to view the web page. If the web page is part of a template preview or page preview, the web page will be viewed via a user interface. URLs are modified differently based on the user interface used to view the web page.

The web publishing system determines whether the URL is a page load URL 508. A page load URL links to another web page and normally causes the browser to replace the current page with the linked page or bring up a new browser window. If the URL is a page load URL and the web page is viewed through one of the two user interfaces (the design UI or the task UI), the URL is modified. The URL is retargeted, and, in the case of the task UI, the link URL is modified to link to a message stating that links have been disabled, as seen in FIG. 4(c) and the discussion of FIG. 4(c), and in the discussion of FIG. 4(g).

Finally, the web publishing system 100 modifies the URL 510. Modifying the URL includes one or both of rewriting the URL or retargeting the URL. The URL is modified based on the context of the web page that contains the URL, the URL type, the user interface used to view the web page that contains the URL, and whether the URL is a page load URL. In some cases, the URL is not modified.

FIGS. 6(a) through 6(c) and 7 comprise a chart that details how the URLs are rewritten and retargeted. The chart 600 of FIGS. 6(a) through 6(c) begins in FIG. 6(a). The input 602 to the chart 600 is a URL that may have to be rewritten. This URL is input as a result of the web page module 114 combining a template from the template module 118 and a content file from the content module 120 into a resulting HTML document. Each URL encountered in the combining process, whether from the template or the content, is processed in the steps described in the following paragraphs and shown in FIGS. 6(a), 6(b), 6(c), and 7. The URL is checked to determine if the URL is of a type that would cause a page to load 604. In one embodiment, URLs within the "<a href>," "<area href>," and "<form action>" HTML tags are recognized as page load URLs, unless they link to the same page. If the URL is recognized as a page load URL, the URL may be modified 606, as detailed in chart 700 of FIG. 7. In some cases, the URL is then returned from the chart 700 of FIG. 7.

Figure 7:
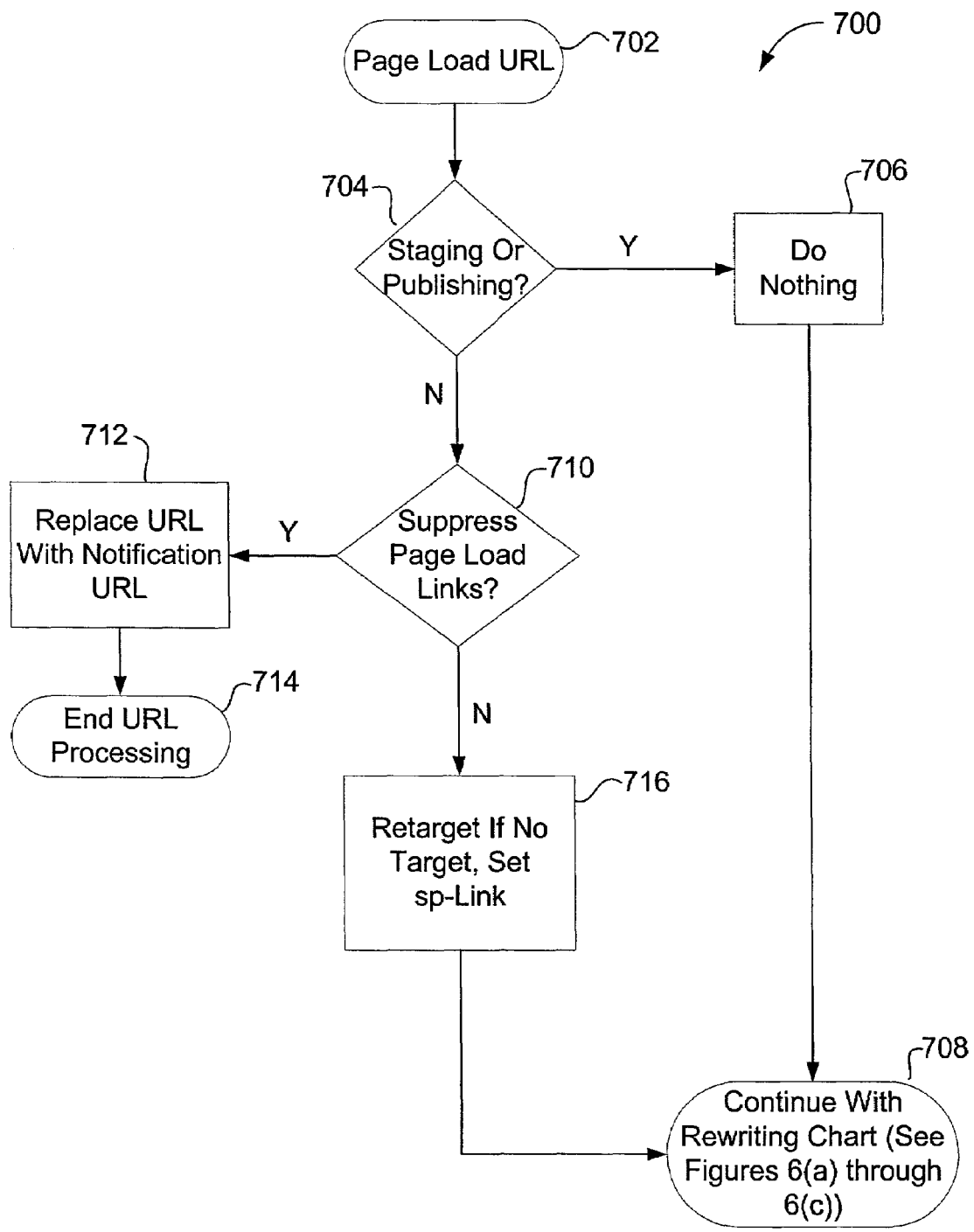
FIG. 7 is a chart showing when URLs are retargeted.

If the URL is not recognized as a page load URL or has been returned from the chart 700 of FIG. 7, the web publishing system 100 determines if the URL is an absolute URL 608. Absolute URLs have the complete address, so the web publishing system 100 treats complete URLs as absolute URLs. If the URL is an absolute URL, the URL is not rewritten 610. This is because absolute URLs work correctly no matter their location, since they include the complete address of the referenced item.

The URL is checked to determine if the URL is a site relative URL 612. The web publishing system 100 recognizes URLs that begin with a slash ("/") as site relative URLs. If the URL is a site relative URL, the context is checked 614 to determine if the context is that of an external publish. If the context is an external publish, the URL is not rewritten 610. This is because the user writes site relative URLs in the web publishing system 100 as being relative to the final location of the web site, which is the external published site. Thus, if the context is an external publish, the URL does not have to be rewritten in order to function correctly.

If the context is not an external publish, whether a site base for the web site has been specified is determined 616. If the site base has been specified, the site base is added to the site relative URL so that the site relative URL is rewritten as an absolute URL 618. That way, the rewritten URLs will reference the correct location on the user server 110.

If the site base has not been specified, the site relative URL is rewritten as a document relative URL 620. This is because the site relative URL is rewritten under the assumption that the site root on the edit server is the same as the site root on a local user server. For example, "/images/logo.gif" might be rewritten as "../logo.gif." If the URL is not a site relative URL, the URL is sent to FIG. 6(b) 622.

Figure 6A:
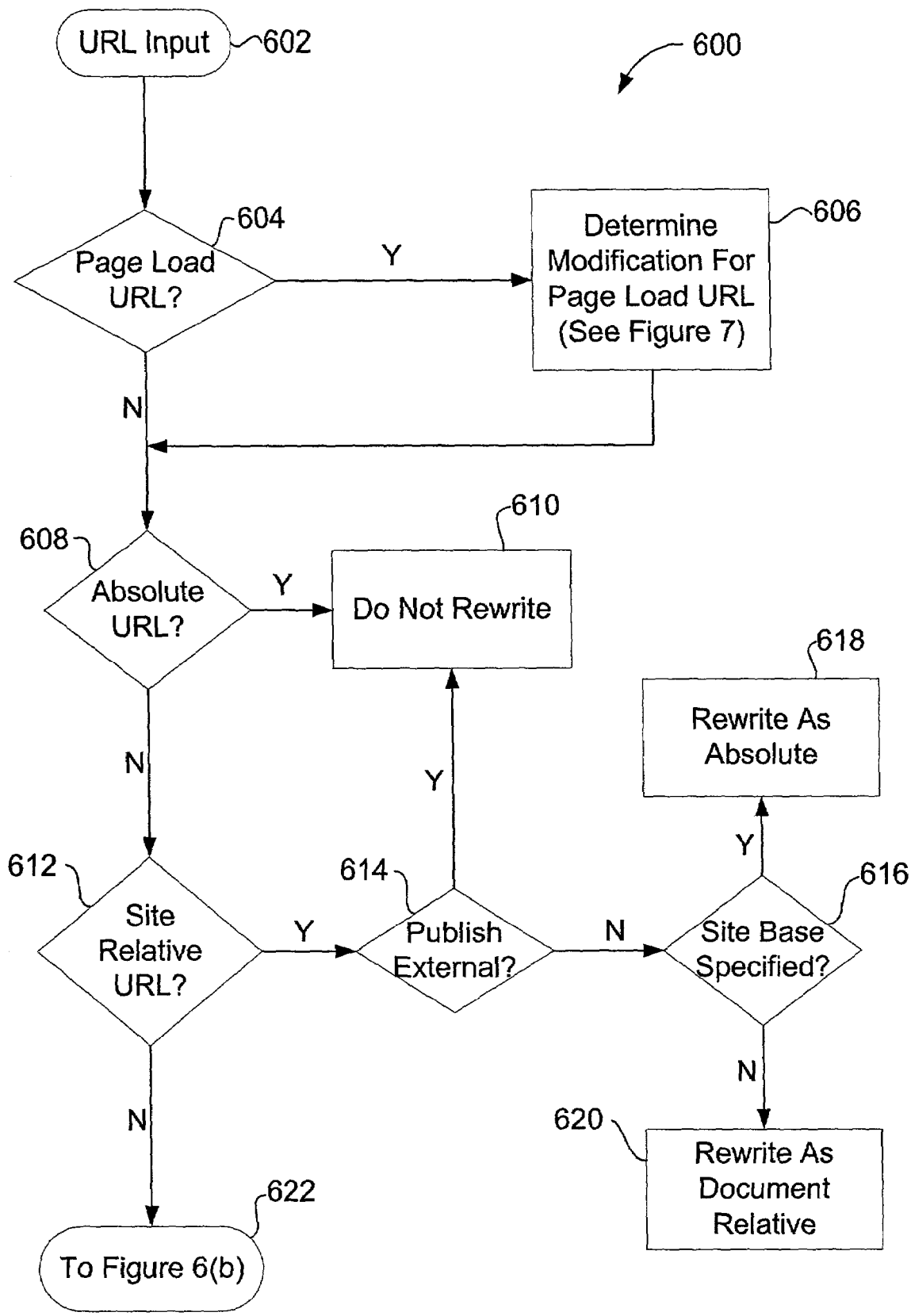
FIGS. 6(a) through 6(c) are a chart showing when the URLs are rewritten.
Figure 6B:
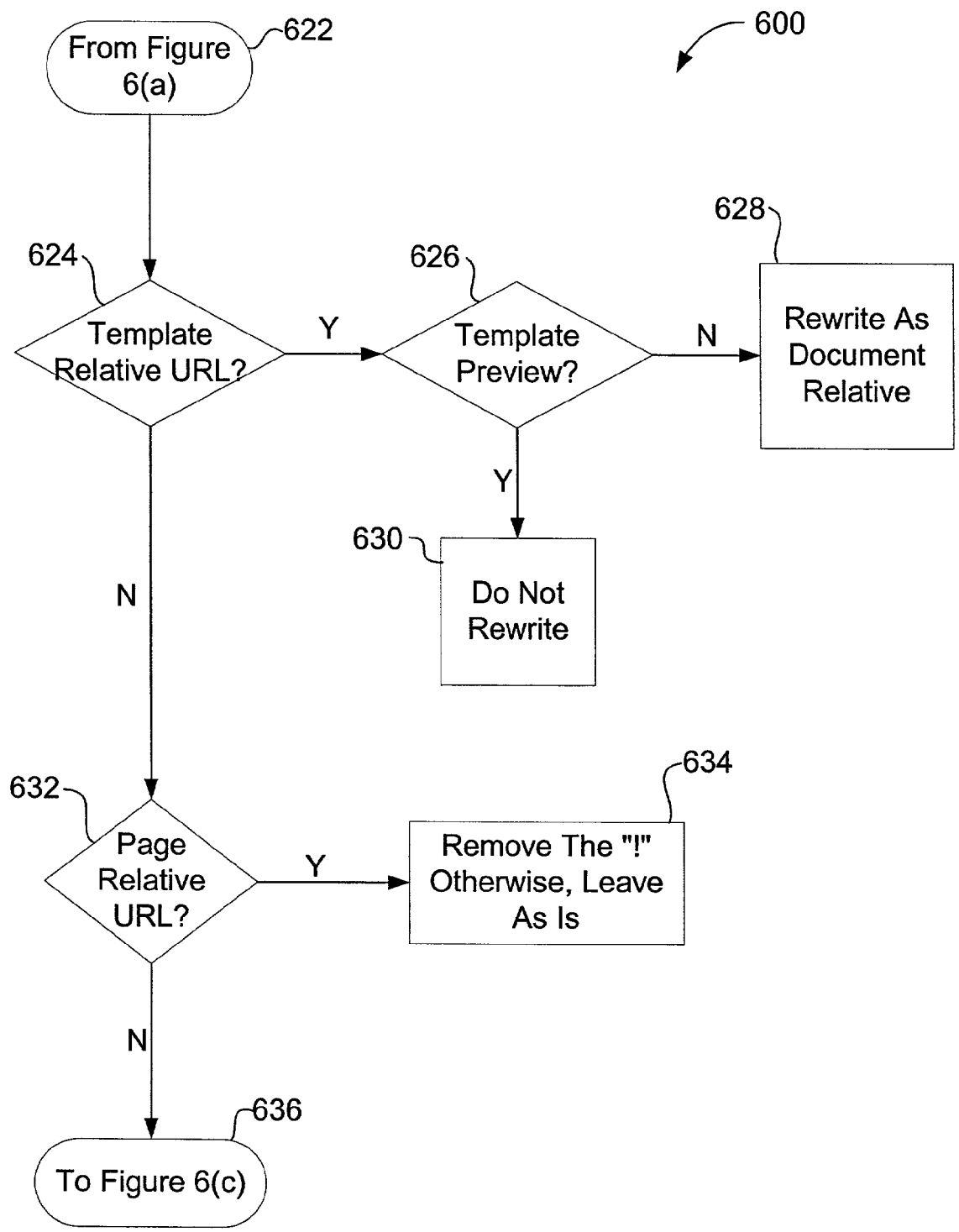

FIG. 6(b) is a continuation of the chart 600 of FIG. 6(a). The URL enters from FIG. 6(a) 622. The URL is checked to determine if the URL is a template relative URL 624. Document relative URLs in a template file are assumed to be template relative URLs, if no other identifying marks are present. If the URL is a template relative URL, the context is checked to determine if the context is that of a template preview 626. If the context is that of a template preview, the URL is correct and is not rewritten 630. This is because template relative URLs specify a location relative to the template, and the displayed template preview is in the correct location for these template relative URLs to function correctly. If the context is other than a template preview, the template relative URL is rewritten as a document relative URL 628. The web publishing system 100 does this by expanding the template relative URL to the full path, then reducing the URL to a page relative URL.

For example, a template is located at "/templates/tmpl.pbt" and contains an image URL written as "../images/logo.gif." The page based on the template exists at "/news/recent/page-.htm." The web publishing system 100 modifies the image URL when the page is created so that the image URL still references the same image. First, the image URL from the template is changed to, "/images/logo.gif." Then, the image URL is rewritten so that it references the same image from the page location. The new image URL is, "../../images/logo.gif."

The URL is checked to determine if the URL is a page relative URL 632. Page relative URLs are identified with a marking code. Preferably, page relative URLs are identified with the marking code of an exclamation point ("!"). If the URL is page relative, the marking code is removed from the front of the URL and the URL is otherwise left untouched 634. This allows the page relative URL to function correctly in its location in a web page. However, the page relative URL will generally not function correctly in a template preview, since the page relative URL references a file in relation to the final web page location, not the template location. If the URL is not a page relative URL, the URL is sent to FIG. 6(c) 636.

Figure 6C:
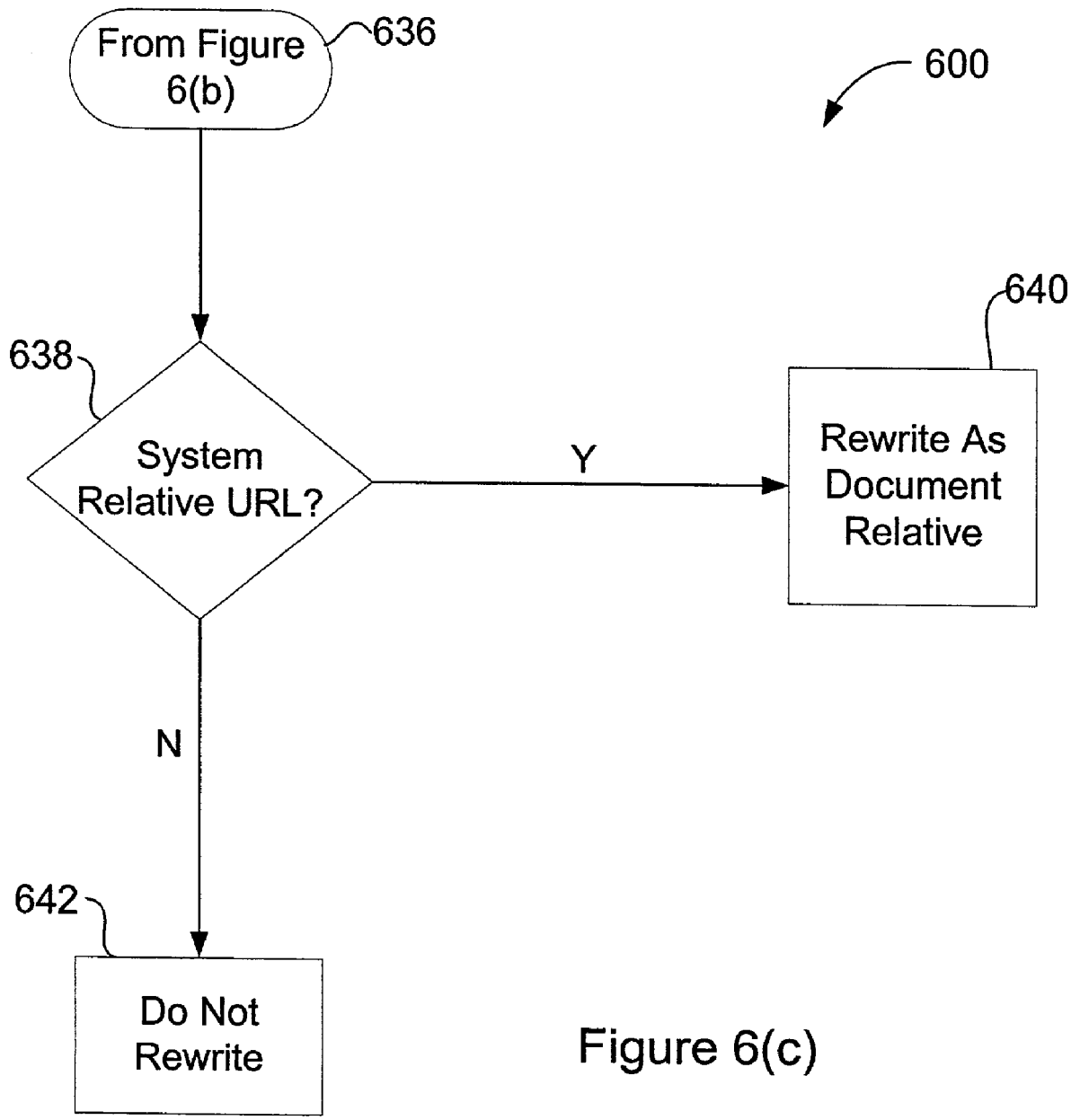

FIG. 6(c) is a continuation of the chart 600 of FIG. 6(b). The URL enters from FIG. 6(b) 636. The URL is checked to determine if the URL is a system relative URL 638. System relative URLs are identified with a marking code. Preferably, system relative URLs are identified with the marking code of "pub:". If the URL is a system relative URL, the URL is rewritten as a document relative URL 640. To rewrite the system relative URL, the "pub:" is removed. The rest of the URL is a site-relative URL, which is relative to the top of the publish system. The top of the publish system is not necessarily the same as the top of the actual site. Thus, next the same modification as detailed above with respect to template relative URLs. The web publishing system 100 expands the URL to the full path, then reduces the URL to a page relative URL.

If the URL reaches this point and has not modified the URL or determined that no modification is necessary, the URL is either a same page link or a type of URL the web publishing system 100 does not recognize. In either case, the web publishing system 100 does not rewrite 642 the URL.

FIG. 7 is a chart 700 detailing the function of determining whether the URL needs to be retargeted, and if so, retargeting the URL. The page load URL is first input 702. The context is checked 704 to determine if the context is a staging or publishing context, either local or external. If the context is a staging or publishing context, the URL is not retargeted 706. The unmodified URL is output 708 back to the URL rewriting chart of FIG. 6.

If the context is not a staging or publishing context, the user interface is checked to determine whether the page load links should be suppressed 710. If the user is using the task UI, the page load links should be suppressed. Otherwise, the page load links should not be suppressed. If user is using the task UI and the page load links should be suppressed, the page load URL is replaced 712 with a notification URL. A notification URL is a link to a notification message stating that the link has been disabled. As a result of the notification URL, when the user clicks on a page load link in the task UI, the user will be presented with a notification that links have been disabled in the task UI. After the URL has been replaced with a notification URL, no further processing need be performed 714 on that URL. The URL is not returned to the rewriting chart, since the URL already has been completely rewritten.

If the page load links should not be suppressed, the URL is retargeted 716. Retargeting URLs provides the advantages of presenting the page in the correct part of the browser window and signaling the web publishing system 100 that a page has been loaded. Preferably, the URL is retargeted only if the URL does not already have a target specified, so that if the URL is an external URL that targets its own window, the targeted external URL works properly. As shown in FIG. 4(*c*), when a user links to another page, the linked page does not take up the entire browser window. Instead, the URL is retargeted so that the linked page appears in one area of the browser window, and a navigation area 402 remains in the rest of the window. Internal URLs are retargeted differently than external URLs, as described with respect to FIG. 4(*c*), above. In order to place the linked page in the appropriate browser window area, the target attribute of the linked page is changed to the correct frame. Further, when a URL is retargeted, a parameter is also added to the URL to capture the fact that a new page was loaded. When the web publishing system 100 sees this parameter, it knows a new page was loaded via a link and can update the user interface and internal state as needed. After being retargeted, the modified URL is output 708 back to the URL rewriting chart in FIG. 6(*a*).

Automatic Linking/Automatic Content:

One feature, found in some embodiments, is the automatic linking of documents and the automatic inclusion of content in documents. In one aspect, a document is automatically linked to other documents. Alternatively, content from other documents is automatically included in a document. In another aspect, links are automatically created within a single page. Alternatively, content from within a page is listed or otherwise presented again on that same page. The following description provides a general description of automatic linking. Appendix II provides more detail on how automatic linking is accomplished in one embodiment of the invention.

Figure 8:
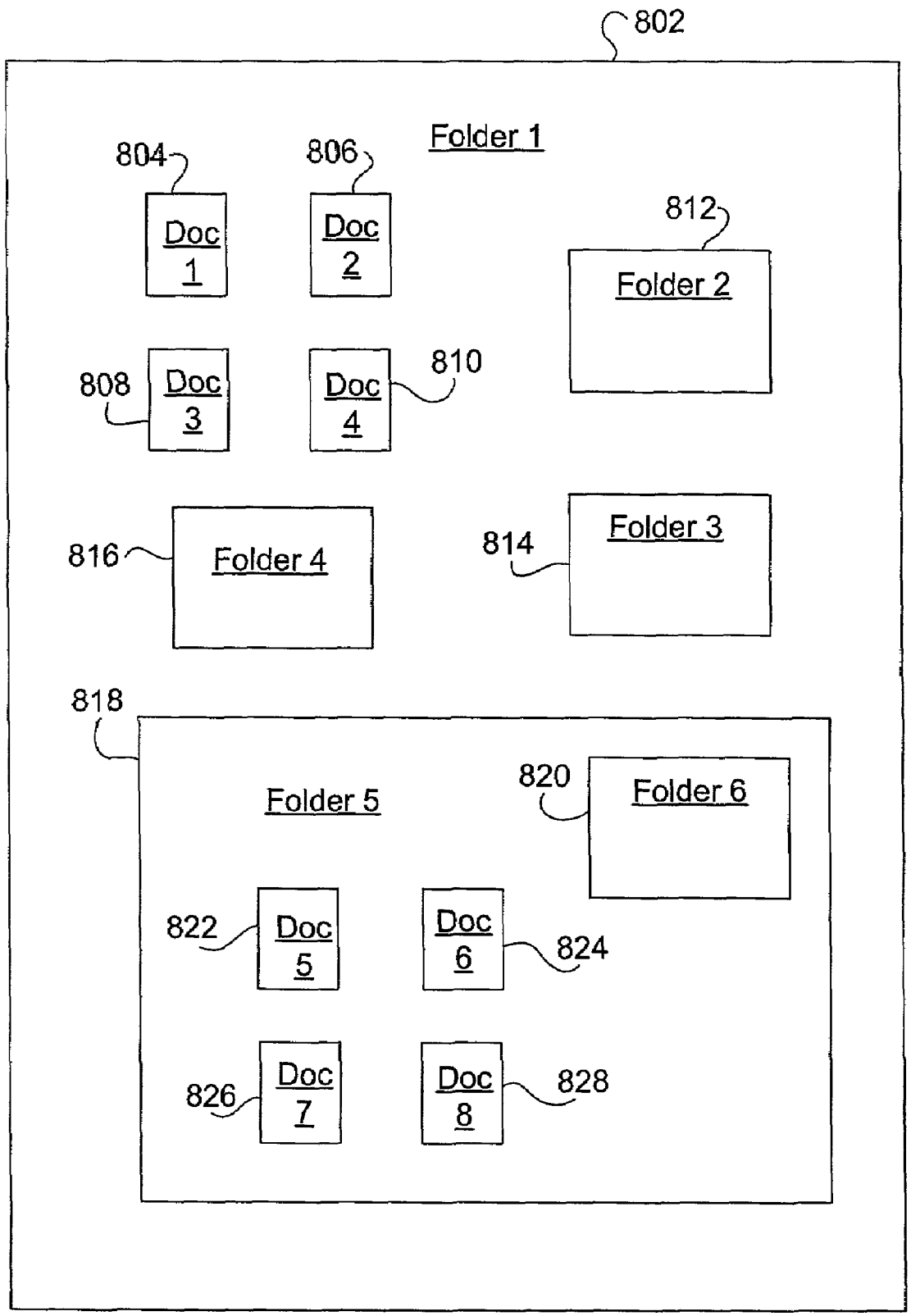
FIG. 8 is a block diagram showing a simplified overview of an embodiment of a file organizational structure.

Linking to Other Pages:

Some embodiments where links to other web pages are automatically generated use the location of the other web pages to accomplish that link generation. FIG. 8 is a block diagram showing a simplified overview of an embodiment of a file organizational structure. File organizational structures are well known in the art. In the file organizational structure shown in FIG. 8, the general structure is that of folders and files. A first folder 802 (also labeled as "Folder 1" in FIG. 8) is the top level of the organizational sure. The first folder 802 contains documents 804, 806, 808, and 810 and other folders 812, 814, 816, and 818. The folders 812, 814, 816, and 818 may in turn contain documents, other files, and other folders. This can be seen with the fifth folder 818 (also labeled as "Folder 5" in FIG. 8). The fifth folder 818 contains documents 822, 824, 826, and 828, as well as a sixth folder 820 (also labeled as "Folder 6" in FIG. 8). The sixth folder 820, in turn, can contain still more documents, files and folders.

The web publishing system 100 organizes the web pages created in a similar organizational structure. Content files can be treated as web pages for organizational purposes, since it is known which template the content files will be merged with to form the web pages. Thus, the content files can be treated as having the same location within the organizational structure as the web pages that will result from the merging of the template with that content file. Thus, the web pages and content files are treated as being within folders in an organizational structure. The user can see where in the organizational structure content files/web pages are stored by using the navigation area 402, shown in FIGS. 4(*a*) through and 4(*f*). The navigation area 402 shown in FIG. 4(*a*) shows one top-level folder. The user can click on the top-level folder to see the files and folders within that top-level folder. The user can then click on folders within the top-level folder to see the contents within those folders. The file structure manager module 115 stores the organization of the files used in the web publishing system 100.

The user determines where in the organizational structure web pages will be located. In one embodiment, when creating a template, the user may define where the web pages based on that template will be located. In another embodiment, when entering content, the user may define the location for the web page that contains that content. In another embodiment, the user may specify and change the location of the web pages and content files after their creation. This can be done by such well-known methods as navigating through a graphical representation of the organizational structure, and "dragging and dropping" the files to the desired location, or "cutting and pasting" the files to the desired location, or through other methods. In yet another embodiment, the user could use all of the aforementioned methods for determining the location of the web pages as desired.

As each document—template file, content file, or web page—is created, deleted, or changed, the file structure manager module 115 tracks the creation, deletion or change. In some embodiments, the file structure manager module 115 also automatically causes other contents to make changes based on the first change, if necessary.

Figure 9:
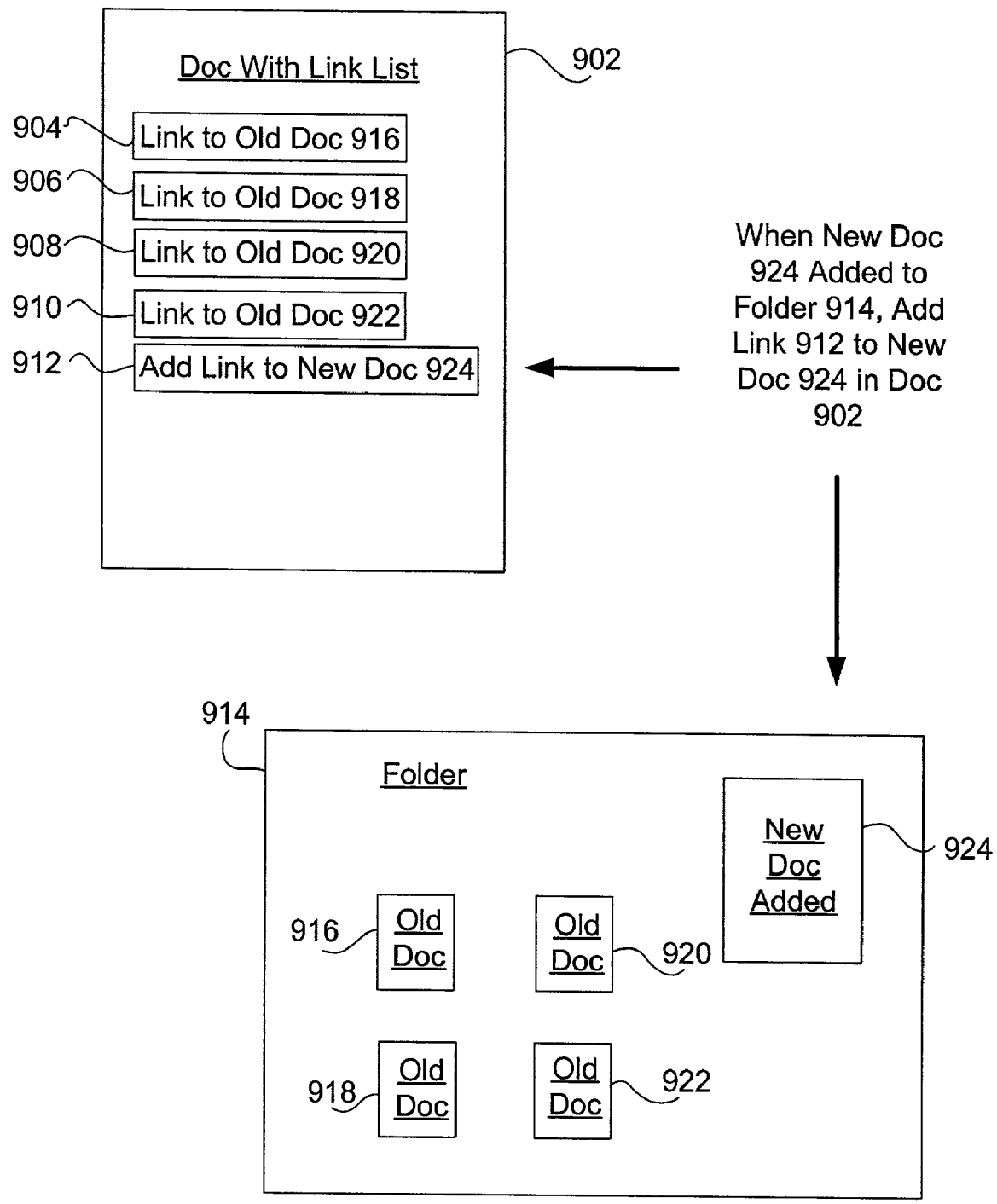
FIG. 9 is a block diagram showing an example of how links to other documents are automatically generated in a document.

FIG. 9 is a block diagram showing an example of how links to other documents are automatically generated in a document. As seen in FIG. 9, a document 902 (the "list document" 902) includes a list of links 904, 906, 908, and 910 to other documents 916, 918, 920, and 922 ("linked documents"). The linked documents 916, 918, 920, and 922 are located in folder 914. When a new linked document 924 is added to folder 914, a new link 912 to the linked document 924 is automatically added to the list document 902.

In one embodiment, the linked document 902 is created as follows. When the user creates the template for the list document 902, the user defines what documents will be linked. In some embodiments, this is done by specifying the location of the linked documents within the file organizational structure. Thus, when creating the template for the list document 902 in FIG. 9, the user specifies that the linked documents will be in folder 914. Then, when the list document 902 is formed by combining the template with a content file, the web page module 114 reads the specification for the location for the linked documents. The web page module 114 then retrieves the proper links for the linked documents from the file structure manager module 115, and adds the links to the resulting web page. If the template for the list document 902 specifies that the list will include all documents in folder 914, for example, the web page module 114 will send a request to the file structure manager module 115 for the locations of all the documents in folder 914, and create links to those documents in the list document 902.

The user can specify the linked documents in other ways than just a single folder location. The user can specify linked documents in ways other than location, also. The user can specify one or more locations in the organizational structure, names or partial names (with wild cards, such as any files that have names that begin with a particular letter), files by dates (the ten newest files), or by other identifying features. The user can also specify that a random selection of documents, or a random subset of documents otherwise specified, be linked.

In addition to specifying the linked documents, the user specifies how the linked documents will be identified in the list document 902. For example, if the linked documents are web pages formed from content files that include a "title" field, the user can specify that the text from the title field be shown in the list document, and that the text shown in the list document is a hypertext link to the linked document. In some embodiments, the list document 902 is created with just a list and no links. Using the above example, the list document 902 then lists the titles of specified web pages, but no links to the specified web pages.

The user may also specify the length and organization of the list in the list document 902. For example, the user specifies how the list will be sorted (for example, alphabetically by linked document title, by date of the linked documents' creation, randomly, or otherwise), the direction of sorting (for example, alphabetically A-to-Z or Z-to-A, or otherwise) and how many linked document links to display (for example, all documents, the most recent ten documents, documents selected at random, or otherwise).

In some cases, no documents may meet the specification for linked documents. The user may define information or content that is to be displayed in such a case. Then, instead of having a blank document when no documents meet the specification, the user-defined information or content is displayed.

To remain accurate, the list page 902 should be updated when linked documents meeting the specification for documents to be listed on the list page 902 are added or changed. In some embodiments, the list page 902 is updated when the user specifies that the list page 902 should be published. When this occurs, the web page module 114 forms the list page 902 from the template and content files. The web page module 114 reads the link specification in the template file for the list page 902 and retrieves the relevant files to be linked and their locations from the file structure manager module 115. The web page module 114 then inserts the links to the linked documents into the web page formed from the template and content files.

In other embodiments, the file structure manager module 115 searches all the templates in the system whenever a content file is created or changed. The file structure manager module 115 determines whet the new or changed content should be reflected in any list documents 902. If so, the file structure manager module 115 sends instructions to remove the current version of the list document 902 from cache, so that the next time the list document 902 is needed, it is formed anew with the correct list of links instead of retrieved from cache. The file structure manager module 115 may also immediately cause the web page module 114 to form the list document 902 with the correct list of links and send the list document 902 to the publish module 116, which sends the list document 902 on to the user server 110. Alternatively, the web page module 114 may wait until the created or changed linked documents are published on the user server 110 via the publish module 116, and automatically publish the new, correct list document 902 at the same time.

Such link pages 902 can also be automatically formed in systems that do not follow the template/content scheme. In such systems, the link page would still include a specification for which pages to link to. A file structure manager module 115 can track when pages meeting the specification are saved in the system, and automatically trigger the updating of the link list in the link page. Thus, when a page is created by a user, and the user selects a "save" command, the page is saved. The file structure manager module 115 also automatically checks the files in the system to see if the saved page meets the specification within link pages. If so, the link page is automatically updated. This is particularly useful when linking to non-HTML content such as multimedia files (sound files, movie files, etc.) and text documents (documents in .pdf format, in Microsoft® Word® format, etc.).

Linking Within a Page:

Some embodiments of the web publishing system 100 are also able to automatically create a list of links to locations on the same document in which the list of links appears. This is generally useful when a single document contains more information than can be shown on the screen at once. By including links to locations on the same document, a user may jump directly to desired information rather than searching or scrolling through the document. One common example of such a document is a "FAQ" (Frequently Asked Questions) document, where there is a list of questions at the top of a document such as a web page. Each question is a hypertext link to text providing the answer to that question elsewhere on the same web page. The list of links acts as an index to the information located elsewhere on the web page. Thus, such a document is an "index" document.

Figure 10:
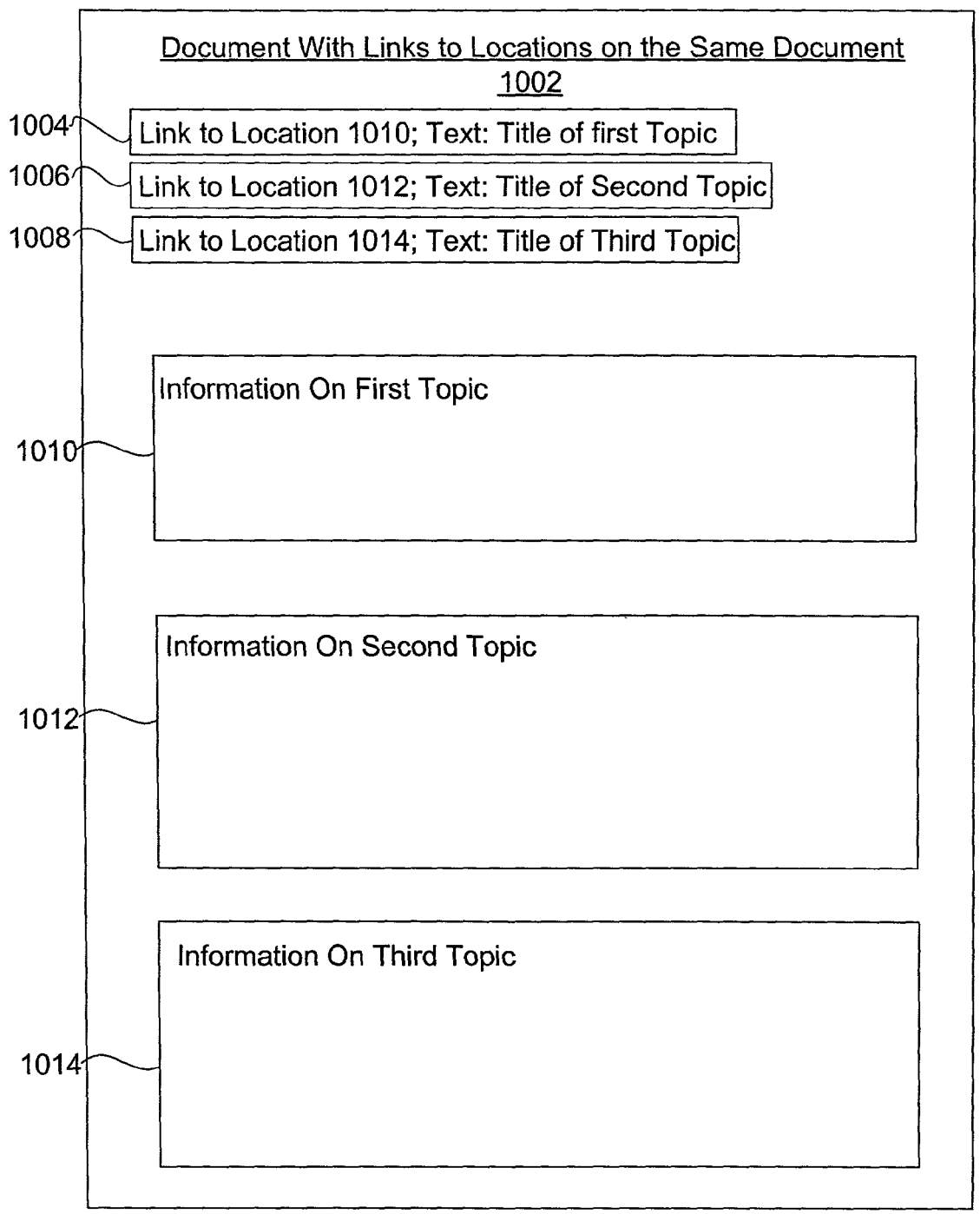
FIG. 10 is a diagram of an index document.

FIG. 10 is a diagram of such an index document 1002. The index document 1002 includes an index with links 1004, 1006, and 1008 to locations elsewhere on the index document 1002. In the illustrated embodiment, the links 1004, 1006, and 1008 are hypertext links where the text is the title of three topics. Below the links 1004, 1006, and 1008, in three separate locations 1010, 1012, and 1014 on the index document 1002, is information on each of the three topics. When a user wished to see information on the first topic, the user clicks on link 1004, which takes the user to location 1010, where there is information on the first topic. The user can similarly access information on the other topics.

Such same page links are useful because in some index documents 1002, there are a large number of topics with information (or similar type data structures), which make finding the desired information difficult without such a list of links.

In some embodiments, the index document 1002 is created as follows. The format of the content to be added, such as the information on the topics at locations 1010, 1012, and 1014 in the index document 1002, is defined when the user creates the template for the index document 1002. One way to define the format is to allow a loop of content entries. A loop of content entries is where the user defines a field or fields for content to be added, and also provides a special tag allowing that field or those fields to be repeated. Then, when creating the content file based on that template, the user may reuse the fields to add information as many times as the user wishes. Each reuse of the fields is a separate data piece.

One example of this is a web page with a list of locations for a chain of retail stores. The template would include a field for an address, and specify that the field may be repeated. When creating the content file, a user would then enter as many addresses as there are locations for the stores. The resultant web page would list each address. Such a field, or multiple fields, that allows multiple instances of content during creation of the content file is called a loop. Each address, in this example, is an instance of the looped fields. Each time the user adds an instance of the looped fields, the user adds a new piece of data for which an entry in the index may be generated.

To provide an index in the index document 1002, a special tag is included in the template file. This tag specifies that there is a loop in the web page based on the template file. When the web page module 114 forms the web page from the template file and a content file, the web page module 114 creates an index with information from each instance of the loop fields.

The user has the freedom to specify characteristics of index when the user creates the template file. For example, while FIG. 10 shows the index document 1002 as having an index with links 1004, 1006, and 1008 to the locations on the index document 1002, the index may only include the titles of the topic, without links to the information on the topics. In an example of such a case, the user defined a loop with a title field and an information field. When a user created the content file, the user entered one or more titles and information related to the title. Then, when the web page module 114 forms the web page, the web page module creates the index from each of the title fields. Thus, the user can specify an index with or without links when creating the template.

Similarly, the user can specify a subset of the instances of the looped fields to be in the index. For example, the looped fields may be an alphabetical phone list, with names and phone numbers. The index for the web page may contain only the names that begin with the letter "A," with links to the appropriate locations on the page.

Unlike the case where a page includes automatically generated links to other pages, in the case of an index in an index document 1002, the file structure manager module 115 does not have to track changes to each content file for possible changes to other pages that link to the web page formed from the content file. The index document 1002 is self contained; the links that are automatically generated only link to the same page. Thus, when a user changes the content file for the index document 1002 and publishes it, the web page module 114 will combine the template file and content file and correctly automatically generate the index and, if required, the links.

In some cases, the document may not have any instances of the looped fields that meet the specification for index entries. The user may define information or content that is to be displayed in such a case. Then, instead of having a blank index when no instances meet the specification, the user-defined information or content is displayed.

While the list page 902 and the index document 1002 have been described as separate documents, some pages may be both a list page and an index document. Such a page will have automatically generated links to other pages as well as an automatically generated index.

While the invention has been particularly shown and described with reference to some embodiments, it will be understood by persons skilled in the relevant art that various changes in form and details can be made therein without departing from the spirit and scope of the invention.

APPENDIX I

This Appendix I includes a list of tags used in one embodiment to the invention. In other embodiments, additional tags may be used, entirely different sets of tags may be used, or a scheme different than HTML-style tags may be used. The tags listed below function in a manner similar to those of normal HTML tags. The tags generally have a beginning tag and an associated ending tag that together enclose an area of the document modified by the tags. Each tag may have a set of attributes, that identify or modify the tag, or modify the user interface created by that tag. The tags:

<publish-a>
<publish-edit-marker>
<publish-file-index>
<publish-if-file-index-empty> & <publish-if-file-index-not-empty>
<publish-form-control>
<publish-form-option>
<publish-get>
<publish-group>
<publish-if-cross-post> and <publish-if-not-cross-post>
<publish-if-empty> and <publish-if-not-empty>
<publish-if-loop-empty> and <publish-if-loop-not-empty>
<publish-img>
<publish-include>
<publish-index-anchor>
<publish-index-file>
<publish-index-link>
<publish-loop>
<publish-loop-count>
<publish-loop-counter>
<publish-loop-index>
<publish-lt> & <publish-gt>
<publish-meta>
<publish-rewrite>
<publish-text>
<publish-title>

<publish-a></publish-a>

Used to add HTML links and anchors to templates. Either a pbname or a pbsource attribute is mandatory.

Attributes of <publish-a> tags: pbname, pbsource, pblabel, pblabel_xxx, pbeditmarker, pbeditmarkerdirection, pbhide, pbcontrol, href, name, target, other pbname: The pbname attribute is mandatory if the content of the <publish-a> tag is editable. The value of the pbname attribute must be a unique name.

pbsource: The value of this attribute must be set to the value of a pbname that belongs to another <publish-a> tag on the template (unless it's inside a <publish-file-index>, in which case, it must refer to the pbname of a tag on the indexed pages.) When pbsource is specified, the <publish-a> tag will not be editable and it won't appear on an edit-form.

pblabel: pblabel attributes help create user-friendly URL edit-fields on edit-forms. The value assigned to the pblabel will appear above the edit-field created for the publish-a tag. This can be used to provide additional information as to how a specific field in a template should be used when adding content.

pblabel_xxx: The pblabel_xxx attribute allows you to add labels for each edit-field generated by an editable attribute. These labels can help clarify the expected input or offer brief instructions to people entering information in the edit-form. The _xxx is just a placeholder for the name of the attribute that you would like to create a label for. Labels generated with pblabel_xxx attributes will appear to the right of the edit-fields on the edit-form. If the pblabel_xxx attribute is omitted, a default label will be generated based on the HTML attribute name.

pbeditmarker: This optional attribute determines whether the orange edit-marker will appear beside the edit-field in the Edit-Marker mode or not. If pbeditmarker is omitted, the value will default to yes and the edit-marker will appear. If the value of pbeditmarker is set to no, the edit-marker will not show up.

pbeditmarkerdirection: This attribute control which way the arrow in the orange edit-markers points. It can take four possible values: left, right, up or down. If the attribute is omitted, the value defaults to right.

pbhide: This attribute hides the output of an editable template tag. <publish-a> tags which have a pbhide attribute set to yes will allow users to edit the content of the <publish-a> tag, but that content will not be passed to the pages created with that template. The default value of pbhide is no.

pbcontrol: The pbcontrol attribute specifies that the <publish-a> tag should draw its content from a pull-down menu created with a <publish-form-control> tag. You must have or include a <publish-form-control> on your template to use this attribute.

href: This attribute specifies the target URL. Use an asterisk to make the href attribute editable. Any path information that follows a * will be used as the default value.

name: The name attribute defines the scroll position. Use an asterisk to make this value editable. Any name information that follows the * will be used as the default value.

target: Use an asterisk to make the value of the target attribute editable. Any name information that follows the * will be used as the default value.

other: All other attributes can be set to be editable with an asterisk. Any information that follows the * will be used as the default value.

<publish-edit-marker> . . . </publish-edit-marker>

Used by the template designer to specify the location of an edit symbol (also known as an edit marker) for a tag or group. The pbname attribute is mandatory.

Attributes of <publish-edit-marker> tags: pbname, pbeditmarkerdirection pbname: The pbname attribute is mandatory. The value of this attribute must be set to the value of another pbname on the page.

pbeditmarkerdirection: This attribute control which way the arrow in the orange edit-markers points. It can take four possible values: left, right, up or down. If the attribute is omitted, the value defaults to right.

<publish-file-index> . . . </publish-file-index>

The publish-file-index> tag creates a list of records from content that is located on other pages of the site. The pbsourcefiles attribute is mandatory.

Attributes of <publish-file-index> tags: pbsourcefiles, pbsortname, pbsortformat, pbsortdirection, pbmaxitems, pbfilter, pbfiltername pbsourcefiles: The pbsourcefiles attribute specifies which files should be considered when building the file-index. The value of this attribute may include wildcards or several file specifications (different paths must be separated by semi-colons).

pbsortname: The pbsortname attribute allows a template designer to sort a file-index according to the contents of a specific edit-field. pbsortname should be assigned the value of the pbname of the edit-field that should determine how the file-list is sorted. If this attribute is omitted, the file-index will default to be sorted by filename. You may use up to ten pbsortnames (pbsortname, pbsortname1-pbsortname9) to specify multiple sort fields.

pbsortformat: This attribute controls the type of sort performed. It may be assigned a value of either text or number. If this attribute is omitted, the value will default to text. You may use up to ten pbsortformats (pbsortformat, pbsortformat1-pbsortformat9) to specify multiple sort formats.

pbsortdirection: This attribute controls the direction of a sort. It may be assigned a value of either ascending or descending. If this attribute is omitted, the value will default to ascending. You may use up to ten pbsortdirections (pbsortdirection, pbsortdirection1-pbsortdirection9) to specify multiple sort directions.

pbmaxitems: This attribute can be set to an integer that determines the maximum number of entries displayed in the file-index. This allows the file-index to have fewer entries than the actual number of files. If the pbmaxitems attribute is omitted, all files that match the pattern will be indexed.

pbfilter: The pbfilter attribute allows you to filter the content of a file-index based on the values in a particular field (which may be specified with a pbfiltername attribute). Filter expressions start with an operator (~ or > for example) that indicates the type of comparison. All comparisons are alphabetic (or "{text}" based)— "A" is less than "B" and "100" is less than "20" (though not less than "020") and case-sensitive by default. You can change this default with the options "{nocase}" and "{number}".

pbfiltername: This is the name of the field used for filtering. If this is omitted then filtering defaults to the pbsortname field. To do filtering, either pbfiltername or pbsortname must be present.

<publish-if-file-index-empty> . . . </publish-if-file-index-empty> <publish-if-file-index-not-empty> . . . </publish-if-file-index-not-empty>

Encloses HTML that is included on templated pages depending on whether or not any files meet the criteria defined in the value of the pbsourcefiles attribute. The pbsourcefiles attribute is mandatory.

Attributes of <publish-if-file-index-empty> and <publish-if-file-index-not-empty> tags: pbsourcefiles pbsourcefiles: The pbsourcefiles attribute specifies which files should be considered when building the file-index. The value of this attribute may include wildcards or several file specifications.

<publish-form-control> . . . </publish-form-control>

Used with <publish-form-option> to create pull-down menus that can be used with any editable template tag. The pbname attribute is mandatory.

Attributes of <publish-form-control> tags:pbname, pblabel, pbseparator, size, multiple pbname: The pbname attribute is mandatory. The value of the pbname attribute must be unique.

pblabel: pblabel attributes help identify the pull-down options on edit-forms. The value assigned to the pblabel will appear to the left of the pull-down menu.

pbseparator: This attribute is only relevant when multiple is specified. If the Editor chooses more than one option from the pull-down menu, the values are joined using the pbseparator. The default pbseparator is a comma followed by a blank space (",").

size: The size attribute determines the number of pull-down options that appear when the menu is displayed.

multiple: When multiple is specified, an Editor may choose more than one option from the pull-down menu.

<publish-form-option> . . . </publish-form-option>

Used with <publish-form-control> to create pull-down menus that can be used with any editable template tag.

Attributes of <publish-form-option> tags: pbset_xxx pbset_xxx: The pbset_xxx attribute can be used to pass values to any editable attribute. It defaults to the content of the tag.

<publish-get>

The <publish-get> tag grabs and inserts template field data anywhere on a page.

Attributes of publish-get tags: pbsource, pbattr pbsource: The pbsource attribute is mandatory and must be set to the pbname of a content tag on the template or on templated pages included in a file-index. The <publish-get> tag draws its content from the tag identified in its pbsource.

pbattr: The pbattr attribute is set to the name of an attribute contained in the tag identified by the pbsource. For tags without attributes (<publish-title>, <publish-text>), pbattr is ignored.

<publish-group> . . . </publish-group>

The <publish-group> tag allows editors to group multiple edit-fields on a single edit-form. The pbname attribute is mandatory.

Attributes of publish-group tags: pbname, pblabel, pbeditmarker, pbeditmarkerdirection pbname: The pbname attribute is mandatory. However, the value of the pbname attribute does not need to be unique. All tags that are enclosed with <publish-group> tag that have the same pbname will be edited with the same edit-form.

pblabel: pblabel attributes help create user-friendly edit-fields on edit-input forms. The value assigned to the pblabel will appear above the edit-fields created for the <publish-group> tag.

pbeditmarker: This optional attribute determines whether the orange edit-marker will appear at the point where the group tag would display in the Edit-Marker mode or not. If pbeditmarker is omitted, the value will default to yes and the edit-marker will appear. If the value of pbeditmarker is set to no, the edit-marker will not show up.

pbeditmarkerdirection: This attribute control which way the arrow in the orange edit-markers points. It can take four possible values: left, right, up or down. If the attribute is omitted, the value defaults to right.

<publish-if-cross-post> . . . </publish-if-cross-post> <publish-if-not-cross-post> . . . </publish-if-not-cross-post>

Allows you to display content conditionally depending on whether a page is a cross-post destination or not.

Attributes of <publish-if-cross-post> and <publish-if-not-cross-post> tags: none There are no attributes.

<publish-if-empty> . . . </publish-if-empty> <publish-if-not-empty> . . . </publish-if-not-empty>

These tags look at the tag identified by their pbsource attribute (the pbsource attribute is mandatory, and must match the pbname value for a content tag elsewhere on the template.) If there is no content (whitespace is considered as no content) stored for the named tag then everything inside the <publish-if-empty> tag is included. If there is content in the named tag then the HTML inside the <publish-if-empty> tag is not included. The <publish-if-not-empty> tag is just the opposite.

Attributes of <publish-if-empty> and <publish-if-not-empty> tags: pbsource, pbattr pbsource: The pbsource attribute is mandatory. Its value must be set to the pbname of another content tag on the template.

pbattr: The pbattr attribute identifies the attribute field that the <publish-if-empty> or <publish-if-not-empty> tag should look at when determining whether a source tag is empty or not.

<publish-if-loop-empty> . . . </publish-if-loop-empty><publish-if-loop-not-empty> . . . </publish-if-loop-not-empty>

Encloses HTML that is included only if the specified loop is or is not empty.

Attributes of <publish-if-loop-empty> and <publish-if-loop-not-empty> tags: pbsource pbsource: The pbsource must be set to the value of the pbname of a <publish-loop> tag. You will almost always want to specify the pbsource attribute. However, if you use either the <publish-if-loop-not-empty> or the <publish-if-loop-empty> tag inside a loop, the tags will draw their source from the immediately enclosing loop by default and will not require a pbsource.

<publish-img>

Maps to the HTML <img> tag. Either the pbname or pbsource attribute is mandatory.

Attributes of <publish-img> tags: pbname, pbsource, pblabel, pblabel_xxx pbeditmarker, pbeditmarkerdirection, pbhide, pbcontrol, src, width, height, border, alt, other pbname: The pbname attribute is mandatory if the content of the <publish-img> tag is editable. The value of the pbname attribute must be a unique name within the template.

pbsource: The value of this attribute must be set to the value of a pbname that belongs to another <publish-img> tag on the template. It is useful to set the pbsource when an image is repeated in several places on a templated page.

pblabel: pblabel attributes help create user-friendly image edit-fields on edit-forms. The value assigned to the pblabel will appear above the edit-fields created by the <publish-img> tag.

pblabel_xxx: The pblabel_xxx attribute allows you to add labels for each edit-field generated by an editable attribute. The _xxx is just a placeholder for the name of the attribute that you would like to create a label for. Labels generated with pblabel_xxx attributes will appear to the right of the edit-fields on the edit-form. If the pblabel_xxx attribute is omitted, a default label will be generated based on the HTML attribute name.

pbeditmarker: This optional attribute determines whether the orange edit-marker will appear beside the edit-field in Edit-Marker mode or not. If pbeditmarker is omitted, the value will default to yes and the edit-marker will appear. If the value of pbeditmarker is set to no, the edit-marker will not be displayed.

pbeditmarkerdirect ion: This attribute control which way the arrow in the orange edit-markers points. It can take four possible values: left, right, up or down. If the attribute is omitted, the value defaults to right.

pbhide: This attribute hides the output of an editable template tag. <publish-img> tags which have a pbhide attribute set to yes will allow users to edit the content of the <publish-img> tag, but that content will not be passed to the pages created with that template. The default value of pbhide is no.

pbcontrol: The pbcontrol attribute specifies that the <publish-img> tag should draw its content from a pull-down menu created with a <publish-form-control> tag. You must have or include a <publish-form-control> on your template to use this attribute.

src: the src attribute defines the source URL. Use an asterisk to make the image-source editable. Any path information that follows the * will be used as a default value.

alt: the alt attribute defines the alternate text. Use an asterisk to make the alt-text editable. Any text that follows the * will be the default value.

width: the width attribute defines the image width. Use an asterisk to make the width editable. Any integer that follows the * will be used as a default width value.

height: the height attribute defines the image height. Use an asterisk to make the height editable. Any integer that follows the * will be used as the default height value.

border: the border attribute defines the image border. Use an asterisk to make the border editable. If you do not use an asterisk, the border for all images created will be the border you have chosen and the user will not be able to change it.

other: All other HTML attributes can be made editable with an asterisk.

<publish-include>

The <publish-include> tag is used to incorporate HTML into a template from another file. It allows a common fragment of HTML to be shared by several templates. Any tags that are included are treated as part of the including template. The pbfile attribute is required.

Attributes of <publish-include> tags: pbfile, pbignoredependency pbfile: The pbfile attribute is required. The value must consist of the name and full path of the included file. The path should start with a "/" which represents the top level of the user's account.

pbignoredependency: If a pbignoredependency attribute is set, the including file will not be dependent on the included file. If the include file is changed, the template will not be flagged as modified and your pages will not be republished.

<publish-index-anchor>

The <publish-index-anchor> tag automatically creates an anchor (ie. <a name= . . . >) with a unique name. It is used to create named anchors for items within indexed loops. Used together, the <publish-index-anchor> and <publish-index-link> tags automate the creation of links from entries in an index to corresponding entries in a loop. The pbname attribute is required.

Attributes of <publish-index-anchor> tags:pbname, name, other pbname: The pbname attribute is required. The value must be unique.

name: If a name attribute is supplied it is used as a prefix for the anchor. If no name attribute is supplied the anchor(s) will simply be named "1", "2", etc.

other: Any other attributes in the <publish-index-anchor> tag are passed through unchanged to the <a> tag.

<publish-index-file>

The <publish-index-file> may only appear inside a <publish-file-index> tag. It is replaced with the pathname of the file currently being enumerated by the <publish-file-index> tag that contains it.

Attributes of <publish-index-file> tags: none
There are no attributes.

<publish-index-link> . . . </publish-index-link>

This tag is intended for use inside <publish-file-index> or publish-loop-index tags. It creates a link (ie. <a href= . . . >) from an index entry to the thing being indexed—either a named anchor or an indexed page.

Attributes of <publish-index-link> tags: pbsource, href, other pbsource: The pbsource attribute is not mandatory. When it is present, its value identifies the <publish-a> or <publish-index-anchor> tag to which the <publish-index-link> will link. When used with an index-file, the pbsource should not specified, and the tag will default to produce a link for each page referenced by the <publish-index-file> tag.

href: If present, the value of the href attribute is appended to the URL generated by the <publish-index-link> tag. This allows you include CGI parameters or, in the case of a file-index, an anchor name.

other All other attributes of the <publish-index-link> tag are passed unchanged to the HTML<a> tag generated.

<publish-loop> . . . </publish-loop>

The <publish-loop> tag is used to create repeating sets of items, like tables or lists. Everything inside this tag is repeated for each iteration of the loop. Loops may be nested. The pbname attribute is mandatory.

Attributes of <publish-loop> tags: pbname pbname: The pbname attribute is mandatory. The value of the pbname attribute must be a unique name.

<publish-loop-count>

The <publish-loop-count> tag is replaced with the number of entries in the specified loop tag.

Attributes of <publish-loop-count> tags: pbsource pbsource: The pbsource attribute must refer to the pbname attribute of a <publish-loop> tag at the same level of loop-nesting or in outer loops. If the pbsource tag is omitted, the <publish-loop-count> tag will reference the immediately enclosing loop.

<publish-loop-counter>

The <publish-loop-counter> tag is replaced with the number of the current iteration of a loop. ie. On the first loop iteration this has the value "1", on the second iteration it is "2" and so on.

Attributes of <publish-loop-counter> tags: pbsource pbsource: The pbsource tag must be set to the pbname of an enclosing <publish-loop> tag. If the pbsource is omitted, the <publish-loop-counter> tag will reference the immediately enclosing loop by default.

<publish-loop-index> . . . </publish-loop-index>

The <publish-loop-index> creates an index that corresponds to a publish-loop. As records are added, removed, or rearranged within the source <publish-loop>, the <publish-loop-index> tag automatically revises its index to keep in sync. The pbsource attribute is mandatory.

Attributes of <publish-loop-index> tags: pbsource, pbsortname, pbsortdirection, pbmaxitems pbsource: The pbsource is mandatory and must be set to the value of the pbname of a <publish-loop> tag. All edit-fields within the publish-loop-index must refer to edit-fields named in the source <publish-loop>.

pbsortname: The pbsortname attribute allows a template designer to sort the fields in a publish-loop index alphabetically. It should be assigned the value of the pbname of the edit-field that you wish to determine how the loop index is sorted. If this attribute is omitted, the order of the loop-index will default to match the order of the records in the original source-loop.

pbsortdirection: This attribute controls the direction of an alphabetical sort. It may be assigned a value of either ascending or descending. If this attribute is omitted, the value will default to ascending.

pbmaxitems: This attribute can be set to an integer that determines the maximum number of entries displayed in the loop-index. This allows the loop-index to have fewer entries than the source-loop. If the pbmaxitems attribute is omitted, all records in the source-loop will be indexed by the loop-index.

<publish-lt> & <publish-gt>

The <publish-lt> and <publish-gt> tags are replaced with <and > respectively. You can use <publish-lt> and <publish-gt> to hide the <and > symbols from the web publishing system just as you would use the < and > entities to hide <and > from a browser.

Attributes of <publish-gt> tags: none

There are no attributes.

<publish-meta>

The <publish-meta> tag maps to the HTML <meta> tag. The pbname attribute is mandatory.

Attributes of <publish-meta> tags: pbname, pblabel, pblabel_xxx, pbcontrol, name, content, other pbname: This is a mandatory attribute. The value of the pbname attribute must be unique.

pblabel: pblabel attributes help create user-friendly meta edit-fields on edit-forms. The value assigned to the pblabel will appear above the edit-fields created by the <publish-meta> tag.

pblabel_xxx: The pblabel_xxx attribute allows you to add labels for each edit-field generated by an editable attribute. These labels can help clarify the expected input or offer brief instructions to people entering information in the edit-form. The _xxx is just a placeholder for the name of the attribute that you would like to create a label for. Labels generated with pblabel_xxx attributes will appear to the right of the edit-fields on the edit-form. If the pblabel_xxx attribute is omitted, a default label will be generated based on the HTML attribute name.

pbcontrol: The pbcontrol attribute specifies that the <publish-text> tag should draw its content from a pull-down menu created with a <publish-form-control> tag. You must have or include a <publish-form-control> on your template to use this attribute.

name: The name attribute is the same as its HTML counterpart. The name identifies the type of meta tag you are creating (eg: description, keywords, target).

content: The content attribute corresponds to its HTML counterpart. The value of the content attribute will appear as the value of the content attribute of the HTML meta-tag. Any value preceded by a (*) will be editable.

other: The value of any other attributes preceded by a (*) will be editable.

<publish-rewrite> . . . </publish-rewrite>

This tag specifies that the web publishing system rewrite relative URLs to be absolute. All relative URLs (except for anchor links that reference named anchors on the same page) that are nested in a <publish-rewrite> tag will be rewritten when pages are previewed, edited and published in your account. While editing, links will be treated as if they were external URLs, and pages will open without the Design Manager button bar.

Attributes of <publish-rewrite> tags: pbbase pbbase: The pbbase attribute is optional. It specifies a base address that is prefixed to all relative URL references (except for anchor links that reference named anchors on the same page, <a href="#top">) nested inside the <publish-rewrite> tag. If the pbbase attribute is omitted, the Site Base will be used. Example of pbbase: "http://www.mysite.com/press/".

<publish-text> . . . </publish-text>

The <publish-text> tag is used to create edit-fields for nonspecific text. Any text and HTML that appears between the open and close <publish-text> tag will be used as default content. Either the pbname or pbsource attribute is mandatory.

Attributes of <publish-text> tags: pbname, pbsource, pbrows, pbcols, pblabel, pbeditmarker, pbeditmarkerdirection, pbhide, pbtexteditor, pballowhtml, pbcontrol, wrap pbname: The pbname attribute is mandatory if the content of the <publish-text> tag is editable. The value of the pbname attribute must be a unique name.

pbsource: The value of this attribute must be set to the value of a pbname that belongs to another <publish-text > tag on the template.

pbrows: This optional attribute gives the template designer control over the appearance of the text edit-field on the edit-form. When the value of pbrows is set to 1, the input will be a single line. Any other value will create a corresponding long multiple line text edit-field. If the pbrows attribute is not set, it will be assigned a default value of 5.

pbcols: The pbcols attribute works much like the pbrows attribute, only it affects the width of the text edit-field instead of the height. The default value of this attribute is 60.

pblabel: pblabel attributes help create user-friendly text edit-fields on edit-forms. The value assigned to the pblabel will appear above the edit-form input.

pbeditmarker: This optional attribute determines whether the orange edit-marker will appear beside the edit-field in the Edit-Marker mode or not. If pbeditmarker is omitted, the value will default to yes and the edit-marker will appear. If the value of pbeditmarker is set to no, the edit-marker will not display.

pbeditmarkerdirection: This attribute control which way the arrow in the orange edit-markers points. It can take four possible values: left, right, up or down. If the attribute is omitted, the value defaults to right.

pbhide: This attribute hides the output of an editable template tag. publish-text tags which have a pbhide attribute set to yes will allow users to edit the content of the publish-text tag, but that content will not be passed to the pages created with that template. The default value of pbhide is no.

pbtexteditor: This attribute specifies how text is edited in template edit-forms. If the attribute is omitted, the value will default to the account setting. (If a value has not been set for the account, a default setting of mapeol is used throughout the site.) The pbtexteditor attribute is ignored for single-line text edit-fields. The attribute can have one of three values: mapeol, raw, or rich.

pballowhtml: This attribute controls which HTML tags are allowed in the text edit-field. If pballowhtml is not specified then the default setting (set with the option in the Design area) for the account is used. (If a value has not been set for the account, a default setting of ask is used throughout the site.) The pballowhtml attribute can have one of three values: any, basic, or ask.

pbcontrol: The pbcontrol attribute specifies that the <publish-text> tag should draw its content from a pull-down menu created with a <publish-form-control> tag. You must have or include a <publish-form-control> on your template to use this attribute.

wrap: The wrap attribute is passed through to the HTML <textarea> tag on the edit-form for this field. The wrap attribute controls how the <textarea> edit control wraps text, and how line breaks are returned to the server when the form is submitted. The default value is soft. It can be set to: soft, hard, off.

<publish-title> . . . </publish-title>

The <publish-title> tag maps to the HTML <title> tag. The <publish-title> tag is assigned the pbname: _title.

Attributes of <publish-title> tags:pbcols, pblabel, pbcontrol pbcols: The width of the text edit-field created on the edit-form. The default is 60.

pblabel: pblabel attributes help create user-friendly title edit-fields on edit-forms. The value assigned to the pblabel will appear above the edit-form input.

pbcontrol: The pbcontrol attribute specifies that the <publish-text> tag should draw its content from a pull-down menu created with a <publish-form-control> tag. You must have or include a <publish-form-control> on your template to use this attribute.

APPENDIX II

This Appendix II includes further discussion of the use of special tags used in one embodiment to the invention. It describes more fully how features such as the automatic linking of list documents and the index documents are implemented in that embodiment. While the embodiment described in this appendix has specific requirements, these requirements do not necessary hold over in other embodiments. In other embodiments, additional tags and attributes may be used, entirely different sets of tags and attributes may be used, or a scheme different than HTML-style tags attributes may be used. The discussion:

1. Creating Indexes that Update Automatically when New Content is Added

The template language gives template designers the power to create templated index pages. Templated index pages can save hours of production maintenance time—once an index page has been set up in a template, it will automatically update. For example, in the old days, with only straight HTML, a site developer had to update a site home page every time a breaking news story was posted. Quite likely that developer also had to modify numerous other site pages with links to the new content. With indexes, all of the pages that formerly had to be modified by hand can be updated automatically every time a new story is published. Any page that is affected by a change, (all the pages which link to the new content page in this example) will be published again when the new story is published.

There are a number of different ways to create and customize indexes templates. This section takes a look at the tags and strategies needed to get going with automatically generated indexes.

1.1. Creating an Index that Links to Other Documents with <Publish-File-Index>

The <publish-file-index> tag creates a list of records from content that lives on other pages of the site. As files are added or removed the file-index is automatically updated to reflect the changes.

The file-index may be sorted by various criteria. Sorting is controlled with the pbsortname, pbsortformat and pbsortdirection attributes. The pbsortname tells the web publishing system which field to use when sorting and its value must correspond to the pbname of any editable tag on the indexed pages. The pbsortdirection can be set to "ascending," "descending" or "random" and determines how files are sorted. The pbsortformat attribute can be set to either "text" or "number." By default, values are sorted alphabetically.

File-indexes are best described with an example. Consider an index of press releases. One document is an index of press releases with multiple entries. Each entry corresponds to a press release in a separate press release file.

The template code that would generate the press release file-index is shown below. In the interest of clarity, this example does not show how to create links between the file-index and the indexed files. See Using <publish-file-index> in Conjunction with <publish-index-link> for more information on adding links.

[ 1] <publish-file-index pbsourcefiles="/pr/pr*.htm" pbsortdirection="descending">

[ 2] <publish-text pbsource="_title">Untitled</publish-text>

[ 3] <br>

[ 4] </publish-file-index>

The <publish-file-index> tag on line 1 specifies the source files as "/pr/pr*.htm". This pattern matches all files in the "/pr" directory that start with "pr" and end with ".htm". Because the pbsortdirection attribute has been given the value "descending", the press releases will be listed from newest ("pr003.htm") to oldest ("pr0001.htm"). Since there is no pbsortname specified, the file-index defaults to work with the individual file names.

The <publish-text> tag on line 2 refers the _title field (for example, the document title) of each file. This assumes that the indexed files each have a title set via a <publish-title> tag. If you would like to sort this index by the titles of the pages rather than their file names, you can use a pbsortname attribute:

<publish-file-index pbsourcefiles="/pr/pr*.htm" pbsortdirection="descending" pbsortname="_title">

<publish-text pbsource="_title">Untitled</publish-text><br></publish-file-index>

The above example will sort the press releases by title in descending alphabetical order.

You may set several paths in the pbsourcefiles attribute. This is handy if you would like your file index to list files that are stored in several directories. For example, if you add paths to "/pr/01/pr*.html" and "/pr/02/pr*.html", the file index can list press releases that were published in January and February even though they are stored in different directories by month. Multiple paths must be separated by semi-colons:

[1] <publish-file-index pbsourcefiles="/pr/01/pr*.html;/pr/02/pr*.html"

pbsortdirection="descending">

[2] <publish-text pbsource="_title">Untitled</publish-text>

[3] <br>

[4] </publish-file-index>

You can also use regular expressions in the value of the pbsourcefiles attribute. Regular expressions provide a simple way of identifying multiple directories without having to enumerate each one. For example:

[1] <publish-file-index pbsourcefiles="/pr/[0-9]*/pr*.html" pbsortdirection="random">

[2] <publish-text pbsource="_title">Untitled</publish-text>

[3] <br>

[4] </publish-file-index>

The regular expression in the pbsourcefiles value on line [1] identifies the same files specified in the previous example: pages in the "/pr/01/" and "/pr/02/" directories that have titles that match "pr*.html". The regular expression "[0-9]*" in the pbsourcefiles attribute additionally matches directories called "04", "05" or "12"—any directory that contains two digits.

In the above example, the pbsortdirect ion online [1] has been set to "random." When "random" is selected, the order of the items in the index will be shuffled every time the index page is updated or modified, checked in and approved. The order will also change everytime a site is published with "Publish All," regardless of whether the index file has been altered. Because the order changes when pages are published, the previewed order of the file index in your account may not match the order of the index when published.

There may not be any editable tags inside a <publish-file-index> tag. Only references to other tags may appear. In other words, all tags within a <publish-file-index> must use pbsource rather than pbname.

Attributes of <publish-file-index> tags: pbsourcefiles, pbsortname, pbsortdirection, pbsortformat, pbmaxitems, pbfilter, pbfiltername pbsourcefiles: The pbsourcefiles attribute specifies which files should be considered when building the file-index. The value of this attribute may include wildcards, regular expressions, path variables or several file specifications.

For example:

<publish-file-index pbsourcefiles="1/news/pr*.htm;/old-news/press??.htm">

. . .

</publish-file-index>

The file-index created with the above code will be populated with information from all the files that match the pattern in the value of the pbsourcefiles attribute. The file patterns follow standard Unix filename matching rules. Note: you may not use Publish-relative URLs in pbsourcefiles attributes. When a page is published, only content pages that are currently approved and pages that have been previously approved and published are included in the file-index. During page preview from the Design Manager, however, all pages that meet the criteria specified by the pbsourcefiles attribute will be displayed regardless of the approval status. The pbsourcefiles attribute does not apply to image, binary or template files. You may specify multiple file paths in the pbsourcefiles attribute by separating each with a semi-colon (for example, pbsourcefiles="/2000/01/pr*.html;/2000/02/pr*.html")

pbsortname: The pbsortname attribute allows a template designer to sort a file-index according to the contents of a specific edit-field. pbsortname should be assigned the value of the pbname of the edit-field that should determine how the file-list is sorted. If this attribute is omitted, the file-index will default to be sorted by filename. You may use up to ten pbsortnames (pbsortname, pbsortname1-pbsortname9) to specify multiple sort fields.

pbsortdirection: This attribute controls the direction of a sort. It may be assigned a value of ascending, descending or random. If this attribute is omitted, the value will default to ascending. You may use up to ten pbsortdirections (pbsortdirection, pbsortdirection1-pbsortdirection9) to specify multiple sort directions.

pbsortformat: This attribute controls the type of sort performed. It may be assigned a value of either text or number. If this attribute is omitted, the value will default to text. You may use up to ten pbsortformats (pbsortformat, pbsortformat1-pbsortformat9) to specify multiple sort formats.

pbmaxitems: This attribute can be set to an integer that determines the maximum number of entries displayed in the file-index. This allows the file-index to have fewer entries than the actual number of files. If the pbmaxitems attribute is omitted, all the files that match the pattern will be indexed by the loop-index.

pbfilter: The pbfilter attribute allows you to filter the content of a file index based on the values in a particular field (which may be specified with a pbfiltername attribute). Filter expressions start with an operator (~ or > for example) that indicates the type of comparison. All comparisons are alphabetic (or "{text}" based)—"A" is less than "B" and "100" is less than "20" (though not less than "020") and case-sensitive by default. You can change this default with the options "{nocase}" and "{number}."

You may compare a string (eg: "index" or "news") with the "=", "<" and ">" operators or look for a pattern (eg: "news" or any standard regular expression: "abc.*" or "^(Monday|Tuesday)") with a "~" operator. Any of these comparison operators may be prefixed with "!" to negate the comparison.

Some possible comparisons are:

| Comparison | Example | Filtered files |
| --- | --- | --- |
| ~pattern (or !~pattern) | <publish-file-index pbsourcefiles="file*.html" pbfilter="~index" pbfiltername="title"> | All pages identified by the pbsourcefiles attribute that have pbfiltername="title"> be included in the file index. |
| | The web publishing system can use any standard (POSIX 1003.2) extended regular expressions as a pattern. | Note: Pattern matching is the default—you may omit the "~" before the pattern value except when the pattern you are matching begins with one of the other filter operators (<, > or = for example). |
| =string (or !=string) | <publish-file-index pbsourcefiles="file*.html" pbfilter="=The Best of this Week" pbfiltername="_title"> | All pages identified by the pbsourcefiles attribute that are exactly titled "The Best of this Week" will be |

-continued

| Comparison | Example | Filtered files |
|---|---|---|
| >string (or !>string) | <publish-file-index pbsourcefiles="file*.html" pbfilter="!>Frank" pbfiltername="first_name"> | included in the file index. The capitalization and wording must be exact. Pages titled "The best of this week" will not be included with this pbfilter. All pages identified by the pbsourcefiles attribute that have a "first_name" value that is not (because the "!" is used) greater than "Frank" will be included in the file index. ("Fanny", "Fran", "Bob" but not "George" or "Frank"). Note: if the "!" were not used, all pages that contain values greater than "Frank" would be included in the file index. | pbfiltername: This is the name of the field used for filtering. If this is omitted then filtering defaults to the pbsortname field. To do filtering, either pbfiltername or pbsortname must be present.

2. The Power of Loops: <publish-loop> and Its Kin

In addition to the tags that mirror their HTML counterparts, the web publishing system has a number of tags that add functionality beyond that of mere HTML. Those familiar with a programming language like Perl or JavaScript, know that loops allow a set of commands to be repeated as many times as needed. Like their programming command counterparts, loop tags give users the power to add and update sets of information (like lists or tables) as many times as needed.

The table below can be created and updated with a simple <publish-loop> tag on a template. All the template designer needs to do is nest the text edit-field tags for the "Name", "Age" and "Birthday" information along with their HTML formatting between an open and close <publish-loop> tag.

| Name | Age | Birthday |
|---|---|---|
| Joe | 27 | Dec. 8, 1973 |
| Mary | 30 | Dec. 8, 1970 |
| Sam | 45 | Dec. 8, 1955 |

When pages created with publish-loops are edited, a special menu edit-marker for loops will appear beside each set of information in the publish-loop. Though the menu edit-marker looks like a regular edit-marker, when it is rolled-over the menu edit-marker expands to offer a menu of editing options. Users can use the menu edit-marker to edit, delete, reorder or add to each set of formatted information.

Other tags can be combined with basic <publish-loop> tags to create numbered loop records or display different content depending on whether or not records have been added to a loop. All of the loop features are explored in depth in this section.

2.1. Adding Simple Loops with <publish-loop>

The <publish-loop> tag is used to create repeating sets of items such as tables or lists. Any tag, including <publish-loop> tags themselves, may be nested between open and close <publish-loop> tags. Once nested, these tags become grouped. The first time a <publish-loop> is edited, a single default record will be displayed. This record has a menu edit-marker instead of an individual edit-marker for each tag nested within the <publish-loop>.

The menu edit-marker allows an editor to edit this initial record or add a new record above or below it. If a new record is added, an edit-form with edit-fields for each tag contained in the <publish-loop> will collect all of the information needed for a complete record.

Each time a new record is added, the information will be formatted with the HTML tags contained in the <publish-loop> tags.

The following template code will create an HTML table by repeating the row information contained in the <publish-loop> tag each time a new set of information is added. In this example, <publish-text> tags are used to collect the "Item" and "Price" information for each record.

```
<html><body>
<table border="1" width="200">
<publish-loop pbname="list">
   <tr>
   <td><publish-text pbname="Item">New Item</publish-text></td>
   <td><publish-text pbname="Price">$0.00</publish-text></td>
   </tr>
</publish-loop>
</table>
</body></html>
```

The above code will generate an HTML table when pages are checked-out for editing. A new record can be added to the table above or below a current record in the table by choosing the appropriate add symbol (add above or add below) on the edit menu.

Attributes of <publish-loops tags: pbname pbname: The pbname attribute is mandatory. The value of the pbname attribute must be unique within the template.

2.2. Features Specific to Loops

There are several features and behaviors of loops that require a bit more discussion. The following sections go into more detail about menu edit-markers and the tags used inside <publish-loop> tags.

2.2a. Menu Edit-Markers

The edit-fields inside a loop are grouped for editing and a menu edit-marker is displayed beside each set of looped data when pages are checked-out for editing. The menu edit-marker is displayed either at the first editable field that falls between the open and close <publish-loop> tags that does not specify pbeditmaker="no" or at a <publish-edit-marker> tag—whichever comes first. You cannot use the pbeditmarkerdirection attribute to change the direction of the arrow that appears in a menu edit-marker.

When the user rolls over the menu edit-marker a popup edit menu is displayed. This menu allows you to edit the record, delete it, move the record up, move the record down, add a new record above, and add a new record below the one referenced by the edit-marker.

If a loop is empty, (for example, if no content has yet been added by an editor) the loop is displayed with a dummy loop record and menu edit-marker. The dummy loop makes the structure of the page easier to see and provides a place to add more items.

The menu edit-marker will appear at the spot where the first tag which does not have the pbeditmarker attribute set to no is displayed. For example, if you have three <publish-img> and then a <publish-text> tag in a single <publish-loop>, by default, the menu edit-marker will appear beside the first <publish-img> tag. If you would like the menu edit-marker to appear beside the text-field, add pbeditmarker="no" to each of the <publish-img> tags.

2.3. Indexing Loops with <publish-loop-index>

The <publish-loop-index> tag creates an index that corresponds to a publish-loop. As records are added, removed, or rearranged within the source <publish-loop>, the <publish-loop-index> tag automatically revises its index to keep in sync.

For example, consider a FAQ document. The body of the FAQ—the names and answers to each questions—is generated with a publish-loop. Above the body is a list of only the FAQ questions. This list, or index, is generated with a <publish-loop-index> tag. As records are changed in the body of the FAQ (in the source <publish-loop>), the loop-index at the top is automatically updated (in the <publish-loop-index>).

Because the loop-index corresponds to an existing source-loop, the <publish-loop-index> tag may not contain any editable edit-fields. Another way of saying this is that all edit-fields in a <publish-loop-index> tag must have a pbsource rather than a pbname and that the value of the pbsource must be a pbname assigned to an edit-field in the source-loop.

Although this may be confusing at first, the functionality of the <publish-loop-index> is clarified by looking at the template code that generates this HTML FAQ list. In the interest of clarity, this example does not show how to create links between a source-loop and a loop-index.

[ 1] <publish-loop-index pbsource="faqs">

[ 2] <publish-text pbsource="question"></publish-text>

[ 3] <br>

[ 4] </publish-loop-index>

[ 5]

[ 6] <publish-loop pbname="faqs">

[ 7] <h4>

[ 8] <publish-text pbname="question">Default faq question</publish-text>

[ 9] </h4>

[ 10] <p>

[ 11] <publish-text pbname="answer">Default faq answer.</publish-text>

[ 12] </p>

[ 13] </publish-loop>

The <publish-loop> tag on line 6 (named faqs by the pbname attribute) is a normal publish-loop with two text fields: question and answer. It becomes a source-loop when its pbname is assigned to the pbsource attribute of the <publish-loop-index> on line 1. The <publish-loop-index> looks to the faqs loop for its source values—it may reference either of the edit-fields in the source-loop (question or answer) with non-editable edit-fields assigned pbsource attributes. For example, the <publish-text> tag in the <publish-loop-index> on line 2 uses its pbsource attribute to specify that its content be drawn from the question edit-field in the faqs source-loop.

Because the <publish-loop-index> takes its values from the source-loop, the index it generates is not directly editable and the loop-index will not get an edit-marker. In order to change "How do I use publish" to "How do I use the web publishing system?" an Editor would have to change the value in the original source-loop. Whenever the faqs source-loop gets updated, the changes will be reflected in the loop-index. Any additions or deletions to the source-loop will be reflected in the loop-index as well. Note: if your template source loop has default content, that content will not appear in the loop-index until you edit and Save it.

Attributes of <publish-loop-index> tags: pbsource, pbsortname, pbsortdirection, pbmaxitems pbsource: The pbsource is mandatory and must be set to the value of the pbname of a <publish-loop> tag. All edit-fields within the <publish-loop-index> must refer to edit-fields named in the source <publish-loop>.

pbsortname: The pbsortname attribute allows a template designer to sort the fields in a publish-loop index alphabetically. pbsortname should be assigned the value of the pbname of the edit-field that should determine how the loop index is sorted. If this attribute is omitted, the order of the loop-index will default to match the order of the records in the original source-loop.

pbsortdirection: This attribute controls the direction of an alphabetical sort. It may be assigned a value of either ascending or descending. If this attribute is omitted, the value will default to ascending.

pbmaxitems: This attribute can be set to an integer that determines the maximum number of entries displayed in the loop-index. This allows the loop-index to have fewer entries than the source-loop. If the pbmaxitems attribute is omitted, all records in the source-loop will be indexed by the loop-index.

2.3a. Sorting Loop-Indexes

Though it is nice that loop-indexes automatically match the order of records in their source-loop, it is sometimes desirable to arrange loop-indexes in other ways. For example, a source-loop that contains information about company employees may be arranged by department. Its loop-index, however, might consists only of employee names and would be far more useful if arranged alphabetically according to the first letter of the names.

This is type of sorting can be done with the pbsortname attribute. pbsortname should be assigned the value of the pbname of the edit-field that should determine how the file-list is sorted. The sorting order defaults to ascending (from a to z). However, this order can be overruled with the pbsortdirect ion attribute. If a pbsortdirect ion attribute is set to descending, the records in the loop-index will be sorted in reverse alphabetical order.

For example:

<html><body>

<publish-loop pbname="loopsource">
  <publish-text pbname="department"></publish-text><br>
  <publish-text pbname="name"></publish-text><br>
  <publish-text pbname="content"></publish-text><br>
</publish-loop>

<publish-loop-index pbsource="loopsource" pbsortname="name" pbsortdirection="descending">
  <publish-text pbsource="name"></publish-text>
</publish-loop-index>

</body></html>

The above code will produce a loop-index arranged by the values entered in the name text-field in reverse alphabetical order, regardless of how the original records are arranged in the source-loop. If not pbsortname is specified, the sorting will default to the order in which the tags are listed in the <publish-loop>. In the above example, if the pbsortname attribute were omitted, the names would be listed according to the reverse alphabetical order of the values in the department text-field.

2.3b. Displaying Loop-Indexes

Another nice feature of loop-indexes is that the number of records indexed need not be the same as the number of records in the source-loop. This is really handy on pages that only need to reference a subset of the source information: the most recent three updates, or just the names that begin with "A".

Though loop-indexes default to display an index record for each source record, the pbmaxitems attribute can be used to limit the number of index records that are created and displayed on pages. A pbmaxitems value of 5 will produce a loop-index that consists of only the top five records.

The top five records are determined after the loop-index has been sorted—so the top five records in this example may be either the first five alphabetical records, the last five, or the first five records displayed in the source-loop.

3. Linking for Indexes, Including Loop Indexes 3.1. Using <publish-file-index> in Conjunction with <publish-index-link> to Create Links The <publish-index-link> tag is used as a stand alone tag or inside both <publish-index-file> and <publish-index-loop> tags. The <publish-index-link> tag creates a link (for example, <a href= . . . >) from an index record to the thing being indexed—either a named anchor or an indexed page. When used in a file-index, the <publish-index-link> tag can generate a link to either a standard page, or a page with anchor or CGI information.

The code below uses <publish-index-link> to create links around the titles of the files enumerated in a file-index:

<publish-file-index pbsourcefiles="pr*.htm">
    <publish-index-link><publish-text pbsource="_title"></publish-text></publish-index-link><br>

</publish-file-index>

If there are three pages named "pr001.htm", "pr002.htm" and "pr003.htm" then this template produces the following result:

<a href="pr001.htm">Title of pr001</a><br>

<a href="pr002.htm">Title of pr002</a><br>

<a href="pr003.htm">Title of pr003</a><br>

The <publish-index-link> tag generates an <a> tag that links to each enumerated file with a document-relative URL. The <publish-text> tag in the above example, inserts the title of each page into the index. If you want the URL to include an anchor or any CGI parameters, those must be set in the href attribute of the <publish-index-link> tag, as follows:

<publish-index-link href="#intro"><publish-text pbsource="_title"></publish-text></publish-index-link>

The HTML the above template code will produce for each index record will look something like this:

<a href="pr001.htm#item">Title of pr001</a>

Other attributes that appear in the <publish-index-link> tag are passed through to the <a> tag unchanged. For example, you could include a target="_blank" attribute to open the page in a new window.

The <publish-index-link> tag may also be used inside <publish-loop-index> tags to create a document with an index of anchored links.

You may also use the <publish-index-link> tag to create a link to a single <publish-a> tag anywhere on a page (without either a loop- or a file-index tag). For example:

<publish-a pbname="anchor" name="*"></publish-a>Introduction

. . .

<publish-index-link pbsource="anchor">Back</publish-index-link>

In this example, the name attribute of the <publish-a> tag is editable. Because the anchor name value will change according to the whims of an editor, it is impossible for a template Designer to use a second <publish-a> tag to reference it.

However, the <publish-index-link> tag creates an anchor link that will match whatever value is entered in the edit-form. If an Editor uses an edit-form to enter "intro" as the name of the anchor, the above code will produce the following HTML:

<a name="intro"></a>Introduction

. . .

<a href="#intro">Back</a>

Attributes of <publish-index-link> tags: pbsource, href, (other)

pbsource: The pbsource attribute is not mandatory. When it is present, its value identifies the <publish-a> or <publish-index-anchor> tag to which the <publish-index-link> will link. When used with an index-file, the pbsource should not specified, and the tag will default to produce a link for each page referenced by the publish-index-file tag.

href: If present, the value of the href attribute is appended to the URL generated by the <publish-index-link> tag. This allows you include CGI parameters or, in the case of a file-index, an anchor name.

(other) All other attributes of the <publish-index-link> tag are passed unchanged to the HTML <a> tag generated.

3.2. Using <publish-file-index> in Conjunction with <publish-index-file> to Show which File is being Enumerated The <publish-index-file> tag is only used inside <publish-file-index> tags. The <publish-index-file> tag is replaced with the complete path of the file currently being enumerated by a <publish-file-index> tag. For example:

<publish-file-index pbsourcefiles="/pr/pr*.htm"><publish-index-file> (<publish-text pbsource="_title"></publish-text>)<br>

</publish-file-index>

If there are three pages in the "/pr/" directory that begin with "pr", the paths of those files will replace the <publish-index-file> tag. As in the previous example, the <publish-text> tag is replaced by the titles of the pages that match the criteria (provided a page title is defined). The output might look something like this:

/pr/pr0001.htm (Title of First Press Release)

/pr/pr002.htm (Title of Second Press Release)

/pr/pr003.htm (Title of Third Press Release)

The <publish-index-file> tag is useful for debugging or experimenting with file indexes as it clearly shows which files are being enumerated.

You can create links around the file path information generated by the <publish-index-file> tags by nesting them in a <publish-index-link> tag:

<publish-file-index pbsourcefiles="/pr/pr*.htm">

<publish-index-link><publish-index-file></publish-index-link>

<br>

</publish-file-index>

The above template code would create the following output:

<a href="/pr/pr0001.htm">/pr/pr0001.html</a><a href="/pr/pr002.htm">/pr/pr002.html</a><a href="/pr/pr002.htm">/pr/pr003.html</a>

The <publish-index-file> tag has no attributes.

3.3. Creating an Index of Anchored Links

Indexes of anchored links are created much like file-indexes are. The web publishing system has a special tag that is used entirely for this purpose: <publish-index-anchor>. The following sections go into more detail about designing templates that can be used for FAQs and other instances when an index of anchored links is necessary.

3.3a. Creating Anchors with <publish-index-anchor> and <publish-loop>

The <publish-index-anchor> tag will automatically create an anchor (ie. <a name= . . . >) and generate a unique value for each anchor name for all records enumerated by a publish-loop. When used with a <publish-index-link> & <publish-loop-index> tag (a combo that will generate an index of anchor links, eg: <a name="anchor1"><a name="anchor2">, etc), <publish-index-anchor> tags can be used to automate the creation of anchored links from an index to corresponding entries.

The below template code is used to generate a list of HTML anchors:

<publish-loop pbname="loop"><publish-index-anchor pbname="anchor" name="item"><publish-text pbname="loopcontent">Default Anchor Text</publish-text>

</publish-loop>

In this example, the <publish-index-anchor> tag automatically generates a unique value for the anchor name by appending an integer to the value of its name attribute (item.) The generated anchors will look like this: item1, item2, item3, etc. Each record in the publish-loop will have a unique anchor that can then be referenced from elsewhere (typically a <publish-loop-index>.

Attributes of <publish-index-anchor> tags: pbname, name, other pbname: The pbname attribute is required. The value must be unique within the template.

name: If a name attribute is supplied it is used as a prefix for the anchor. If no name attribute is supplied the anchor(s) will simply be named "1", "2", etc.

(other) Any other attributes in the <publish-index-anchor> tag are passed through unchanged to the <a> tag.

3.3b. Using <publish-index-link> and <publish-loop-index> to Link to Anchors

When used inside a <publish-loop-index>, the <publish-index-link> tag creates links to named anchors. Each record that the publish-loop-index generates will receive an anchored link that will click through to the original record in the source-loop.

The pbsource attribute of the <publish-index-link> tag should be set to the pbname of the anchor tag: either a publish-a tag or at publish-index-anchor tag.

For example, the below <publish-loop> tag contains a <publish-index-anchor> tag (pbname=anchor) that is used to generate HTML anchors each time an Editor adds a record with the menu edit-marker:

<publish-loop pbname="loop"><publish-index-anchor pbname="anchor" name="item"><publish-text pbname="loopcontent">Default Anchor Text</publish-text>

</publish-loop>

The following template code uses <publish-index-link> (inside a <publish-loop-index> tag) to create an index of anchored links that will link to each of the HTML anchors created:

<publish-loop-index pbsource="loop">
    <publish-index-link pbsource="anchor">
    <publish-text pbsource="loopcontent"></publish-text>
    </publish-index-link><br>

</publish-loop-index>

The pbsource of the <publish-index-link> tag is set to the value of the pbname of the <publish-index-anchor> tag (ie anchor). The pbsource of the <publish-loop-index> tag must be set to the pbname of the <publish-loop> it references as well. This code will generate anchor links that look like:

<a href=#item1>Anchored Title Entered in original loop.</a>

If you prefer to input anchor names yourself, you can use a <publish-a> tag instead of the <publish-index-anchor> tag in the original publish-loop. The below <publish-loop> tag contains a <publish-a> tag (pbname=anchor) that has an editable attribute name. Each time an Editor adds a record with the menu edit-marker, he or she will be prompted to enter a new anchor name:

<publish-loop pbname="loop">
    <publish-a pbname="anchor" name="*item">
    <publish-text pbname="loopcontent">Default Anchor Text</publish-text>
    </publish-a><br>

</publish-loop>

The default value item will be replaced with whatever name value is entered in the edit-form for the <publish-a> tag. In order for this example to work properly, the Editor must make sure that each named anchor is unique. The web publishing system does not ensure that anchors are unique if they are input and edited manually. The possibility of redundant anchors is eliminated when the web publishing system is used to automatically generate anchors with <publish-index-anchor> tags.

The href attribute of the <publish-index-link> tag may be used to pass CGI parameters to the link it generates. For example:

[1] <publish-loop-index pbsource="myloop">

[2] <publish-index-link pbsource="anchor" href="?arg=1">

[3] <publish-text pbsource="loopheader"></publish-text>

[4] </publish-index-link><br>

[5] </publish-loop-index><br><br>

[6] <publish-loop pbname="myloop">

[7] <publish-index-anchor pbname="anchor" name="item">

[8] <b><publish-text pblabel="Enter a Header" pbname="loopheader">Default Header</publish-text></b><br>

[9] <publish-text pblabel="Enter Content" pbname="loopcontent">Default Content</publish-text>

[10] <br><br>

[11] </publish-loop>

The <publish-loop-index> that begins online [1] will generate an index based on the original publish-loop ("myloop", beginning on line [6]). The <publish-index-link> tag on line [2] generates anchor links based on the anchors named by the <publish-index-anchor> tag in the original source loop (line [7]). In addition, the CGI parameter named in the href attribute ("?arg=1") of the <publish-index-link> tag [2] is appended to the anchor link. The generated page might look something like this:

First Anchored Header

Second Anchored Header

Third Anchored Header

First Anchored Header

Content . . .

Second Anchored Header

Content . . .

Third Anchored Header

Content . . .

The HTML of an individual anchor link would look like this:

<a href="item1?arg=1#intro">First Header</a>

We claim:

1. A computer implemented method for building a list document by automatically adding information based on a linked document, comprising:
   providing a specification comprising one or more identifying features of a linked document and information regarding how a plurality of links should be presented;
   searching a group of linked documents to identify one or more linked documents that match one or more of the one or more identifying features in the specification;
   generating a link for each of the one or more identified matching linked documents;
   adding each link for the one or more identified matching linked documents to a list document stored in a first location, wherein the added links include a first and a second uniform resource locator (URL), the first URL being different than a URL for the list document, the second URL comprising the URL for the list document;
   formatting each of the links in the list document for presentation on a user interface in accordance with the information regarding how the plurality of links should be presented;
   automatically updating the generated links of the list document when a document matching one or more of the one or more identifying features in the specification is created or modified in the group of linked documents; and
   publishing the list document, wherein publishing comprises modifying the first URL and storing the list document in a second location.

2. The method of claim 1, wherein said at least one identifying feature of the linked document includes a part of a linked document name.

3. The method of claim 1, wherein generating said link comprises constructing the link based on a file system location for the matching linked document.

4. The method of claim 1, wherein generating said link comprises retrieving the link from a file structure manager module, wherein the file structure manager module is configured to track the organization of files that are added, deleted, or relocated.

5. The method of claim 1, further comprising updating the list document when the list document is published.

6. The method of claim 1, further comprising updating the list document when a content file is created or changed, wherein the content file provides content for the list document when merged with the list document.

7. A system for building a list document by automatically adding information based on a linked document, comprising:
   an edit server;
   an edit client connected to the edit server, the edit client configured to edit said list document, wherein the list document is stored in a first location and includes a specification identifying one or more identifying features of a linked document and information regarding how a plurality of links should be presented;
   a file structure manager module; and
   a web page module, the web page module configured to retrieve from the file structure manager module one or more links for one or more linked documents matching the identifying features, add the retrieved links to the list document, wherein the added links include a first and a second uniform resource locator (URL), the first URL being different than a URL for the list document, the second URL comprising the URL for the list document, format each of the added links in the list document for presentation on a user interface in accordance with the information regarding how the plurality of links should be presented, automatically update the retrieved links of the list document when a linked document matching the specification is added or changed, and publish the list document by modifying the first URL and storing the list document in a second location.

8. The system of claim 7, wherein said one or more identifying features of the linked document includes a location within a file organizational structure.

9. The system of claim 7, wherein said one or more identifying features of the linked document includes a folder location, a name, a partial name, and a date.

10. The system of claim 7, wherein said web page module updates the list document when the list document is published.

11. The system of claim 7, wherein said web page module updates the list document when a content file is created or changed, the content file providing content for the linked document when merged with a template document.

12. A method for building a list document by automatically adding information based on a linked document, comprising:
   creating a list document template, wherein the list document template includes a specification specifying a linked document according to at least one identifying feature of the linked document and information regarding how a plurality of links should be presented;
   creating a content file;
   retrieving one or more links from a file structure manager module, wherein the links are for one or more linked documents according to the specification, and wherein said retrieving is performed by a web page module;
   adding the retrieved links to the list document template, wherein the added links include a first and a second uniform resource locator (URL), the first URL being different than a URL for the list document, the second URL comprising the URL for the list document;
   formatting each of the added links in the list document template for presentation on a user interface in accordance with the information regarding how the plurality of links should be presented;
   merging said list document template with said content file to generate a list document, the list document including the retrieved links and being stored in a first location;
   automatically updating the retrieved links of the list document when a linked document meeting the specification is added or changed, wherein said updating is performed by the web page module; and publishing the list document, wherein publishing comprises modifying the first URL and storing the list document in a second location.

13. A computer implemented method for building a list document by automatically adding information based on a linked document, comprising:

providing a specification comprising one or more identifying features of a linked document and information regarding how a plurality of links should be presented;

providing a location within a file organizational structure comprising a plurality of linked documents, the location housing a subset of the plurality of linked documents;

searching the subset of the plurality of linked documents at the location within the file organizations structure to identify one or more linked documents that match one or more of the one or more identifying features in the specification;

generating a link for each of the one or more identified matching linked documents;

adding each link for the one or more identified matching linked documents to a list document and storing the list document in a first location;

formatting each of the links in the list document for presentation on a user interface in accordance with the information regarding how the plurality of links should be presented;

automatically updating the generated link of the list document when a matching linked document is added or changed; and publishing the list document, wherein publishing comprises storing the list document in a second location and modifying a link in the list document in accordance with the second location.

14. The method of claim 13 wherein the presented links include at least a first human readable reference to a location that is external to the list document and a second human readable reference to a location that is internal to the list document.

15. The method of claim 14 wherein the first human readable reference to the location that is external to the list document comprises a uniform resource locator (URL) that is different from a URL for the list document.

16. The method of claim 14 wherein the second human readable reference to the location that is internal to the list document comprises a uniform resource locator (URL) that is the same as a URL for the list document.

* * * * *